(12) United States Patent
Lu et al.

(10) Patent No.: US 9,755,762 B2
(45) Date of Patent: Sep. 5, 2017

(54) OPTICAL SIGNAL RECOGNITION METHOD AND APPARATUS

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 109 days.

(21) Appl. No.: 14/906,293

(22) PCT Filed: Jun. 27, 2014

(86) PCT No.: PCT/CN2014/080934
§ 371 (c)(1),
(2) Date: Jan. 20, 2016

(87) PCT Pub. No.: WO2015/010517
PCT Pub. Date: Jan. 29, 2015

(65) Prior Publication Data
US 2016/0173204 A1 Jun. 16, 2016

(30) Foreign Application Priority Data
Jul. 24, 2013 (CN) .......................... 2013 1 0314376

(51) Int. Cl.
*H04B 10/08* (2006.01)
*H04B 17/00* (2015.01)
(Continued)

(52) U.S. Cl.
CPC .............. *H04B 10/695* (2013.01); *G01J 5/20* (2013.01); *H04B 10/07953* (2013.01); *H04B 10/116* (2013.01)

(58) Field of Classification Search
USPC .......................................... 398/27, 130, 182
See application file for complete search history.

(56) References Cited

U.S. PATENT DOCUMENTS

2001/0040713 A1* 11/2001 Haruyama ......... H04B 10/1143
398/140
2005/0213693 A1* 9/2005 Page ..................... H04L 7/0008
375/354

(Continued)

*Primary Examiner* — David Payne
*Assistant Examiner* — Pranesh Barua
(74) *Attorney, Agent, or Firm* — Hammer & Associates, P.C.

(57) ABSTRACT

An optical signal recognition method comprises: initializing a recognition apparatus; acquiring optical source voltage values in an acquisition channel to obtain a group of optical source voltage values; comparing the group of optical source voltage values with a comparison threshold, and converting the group of optical source voltage values into optical data; when the optical data is different from optical data obtained in a previous conversion, continuing to acquire optical source voltage values in the acquisition channel, converting a group of optical source voltage values into optical data, and sequentially storing the optical data in a conversion array; when a preset quantity of optical data in the conversion array is different, deleting optical data stored earliest in the conversion array, continuing to acquire optical data and sequentially storing the optical data in the conversion array; and when all optical data in the conversion array is the same, setting frame data as optical data in the conversion array, and returning the frame data. In the present invention, a synchronization signal is canceled, thereby improving the transmission quality and the transmission speed.

21 Claims, 8 Drawing Sheets

(51) Int. Cl.
    *H04B 10/00*      (2013.01)
    *H04B 10/04*      (2006.01)
    *H04B 10/12*      (2006.01)
    *H04B 10/69*      (2013.01)
    *G01J 5/20*       (2006.01)
    *H04B 10/079*    (2013.01)
    *H04B 10/116*    (2013.01)

(56) References Cited

U.S. PATENT DOCUMENTS

| | | | |
|---|---|---|---|
| 2009/0232515 A1* | 9/2009 | Marien | H04B 10/116 398/182 |
| 2009/0238318 A1* | 9/2009 | Song | H04L 25/068 375/355 |
| 2010/0145713 A1* | 6/2010 | Carroll | G10L 19/167 704/500 |
| 2010/0284697 A1* | 11/2010 | Bae | H04B 10/1149 398/130 |
| 2013/0331954 A1* | 12/2013 | McConnell | G06F 15/7842 700/2 |
| 2014/0208403 A1* | 7/2014 | Lu | H04L 63/0838 726/6 |
| 2015/0117870 A1* | 4/2015 | Lu | H04L 1/00 398/202 |

\* cited by examiner

OPTICAL SIGNAL RECOGNITION METHOD AND APPARATUS

TECHNICAL FIELD

The present invention relates to signal processing field, more specifically relates to a method for recognizing optical signal and a device thereof.

PRIOR ART

In the prior art, in technology of receiving optical signal emitted from a display screen by optical sensor elements, different displayers are different in aspects such as manufacture technology, size, luminescent property, etc., which results in that the optical signal is uncontrollable. In addition, environment light and light of host displayer screen affects much on signal quality and received voltage affects light of host screen directly, which makes the received light signal is not correct and great error exists. In the prior art, optical signal is recognized by a method of taking one optical signal as a synchronizing signal of other optical signals, in which data transmission speed is slow.

SUMMARY OF THE INVENTION

The object of the present invention is to provide a method for recognizing optical signal and a device thereof in order to overcome defections in the prior art, which cancels the synchronizing signal and improves data transmission capacity and data transmission speed.

Thus, according to one aspect of the present invention, there is provided a method for recognizing optical signal, comprising:

Step S0, initializing a device of recognizing optical signal;

Step S1, collecting an optical source voltage value in a collecting channel, obtaining a set of optical source voltage values, and storing the collected set of optical source voltage values into a voltage value array;

Step S2, comparing the set of optical source voltage values with a comparison threshold, and generating optical data according to comparing result;

Step S3, determining whether the optical data is identical to the optical data obtained by last time of converting, if yes, going back to Step S1; otherwise, going to Step S4;

Step S4, collecting optical source voltage values in the collecting channel, obtaining a set of optical source values, comparing the set of optical source values with the comparison threshold, generating optical data according to a comparison result, and storing the optical data into a conversion array orderly;

Step S5, determining whether the number of the optical data in the conversion array reaches a preset number, if yes, executing Step S6; otherwise, executing Step S4;

Step S6, determining whether respective optical data in the conversion array are identical, if yes, executing Step S8; otherwise, executing Step S7;

Step S7, deleting the optical data which is the earliest stored in the conversion array, and going back to Step S4; and Step S8, setting frame data as the optical data in the conversion array, and returning the frame data.

According to another aspect of the present invention, there is provided an optical signal recognizing device, comprising: an initializing module, a collecting module, a converting module, a first determining module, a second determining module, a third determining module, a deleting module, a storing module and an outputting module, in which the initializing module is configured to performing initializing;

the collecting module is configured to collect optical voltage value in the collecting channel to obtain a set of optical voltage values;

the converting module is configured to compare the set of optical voltage values and the comparison threshold and generate an optical data according to the comparing result;

the first determining module is configured to determine whether the optical data and the last converted optical data are identical;

the second determining module is configured to determine whether the number of the optical data in the converting array has reached a preset number;

the third determining module is configured to determine whether the optical data in the converting array are identical;

the deleting module is configured to delete the optical data which is the earliest stored in the converting array;

the storing module is configured to store the collected optical voltage values and store the optical data; and the outputting module is configured to set the frame data as the optical data in the converting array and return the frame data.

Comparing with the prior art, the present invention has following advantages: in the method of the present invention, the optical signal of all channels is taken as effective signal and synchronizing signal is cancelled; it is assured that the optical state of two neighbored frame signals emitted by the displayer screen is changed. In this way, in process of recognizing optical signal, once it is recognized that the state of light is changed, it is regarded as next frame of data. The method of the present invention improves data transmission capacity and data transmission rate.

DETAILED DESCRIPTION OF THE DISCLOSURE

The technical solutions of the embodiments are described clearly and completely in conjunction with the accompanying drawings as follows. Apparently, the described embodiments are merely a part of, but not all of, the embodiments according to the disclosure. Based on the described embodiments of the disclosure, other embodiments obtained by those skilled in the art without any inventive work belong to the scope of protection.

In the present embodiments, a terminal includes a smart phone, a pad or a personal computer.

Embodiment 1

Figure 1:
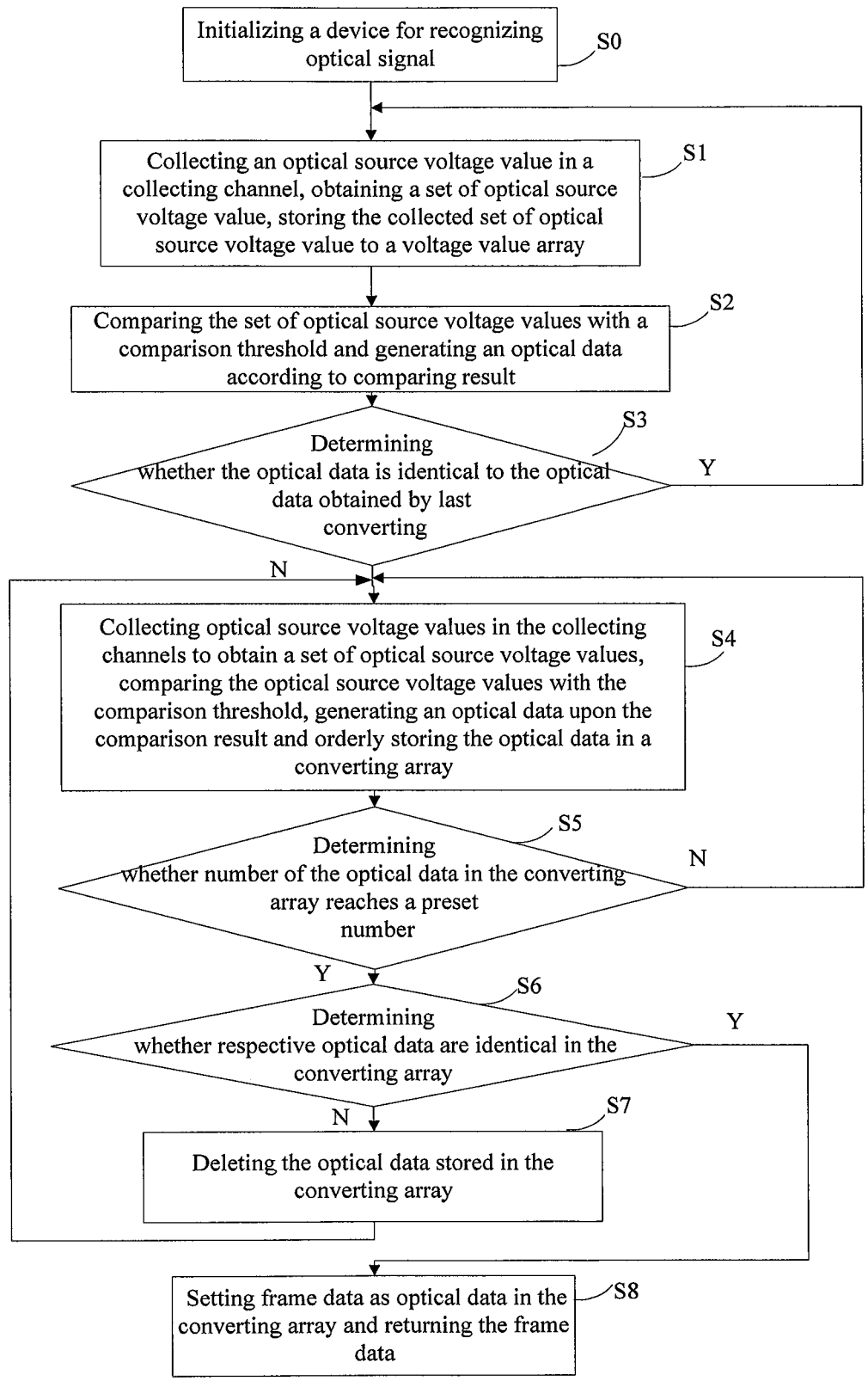
FIG. 1 is a flow chart of a method for recognizing optical signal provided by Embodiment 1 of the present invention.

As shown in FIG. 1, Embodiment 1 of the present invention provides a method for recognizing optical signal, comprises:

Step S0, a device for recognizing optical signal performs initializing;

Step S1, collecting optical source voltage values in collecting channels to obtain a set of optical source voltage values and store the collected set of optical source voltage values in a voltage value array;

Step S2, comparing the set of optical source voltage values and a comparison threshold and generating an optical data upon a comparison result;

Step S3, determining whether the optical data is identical to the optical data obtained by last converting, if yes, executing Step S1; otherwise, executing Step S4;

Step S4, collecting optical source voltage values in the collecting channels to obtain a set of optical source voltage values, comparing the optical source voltage values with the comparison threshold, generating an optical data upon the comparison result and orderly storing the optical data in a converting array;

Step S5, determining whether number of the optical data in the converting array reaches a preset number, if yes, executing Step S6; otherwise going back to Step S4;

Step S6, determining whether respective optical data is identical in the converting array, if yes, executing Step S8; otherwise executing Step S7;

Step S7, deleting the optical data stored earlist in the converting array, going back to Step S4;

Step S8, setting frame data as optical data in the converting array and returning the frame data.

Embodiment 2

Figure 2:
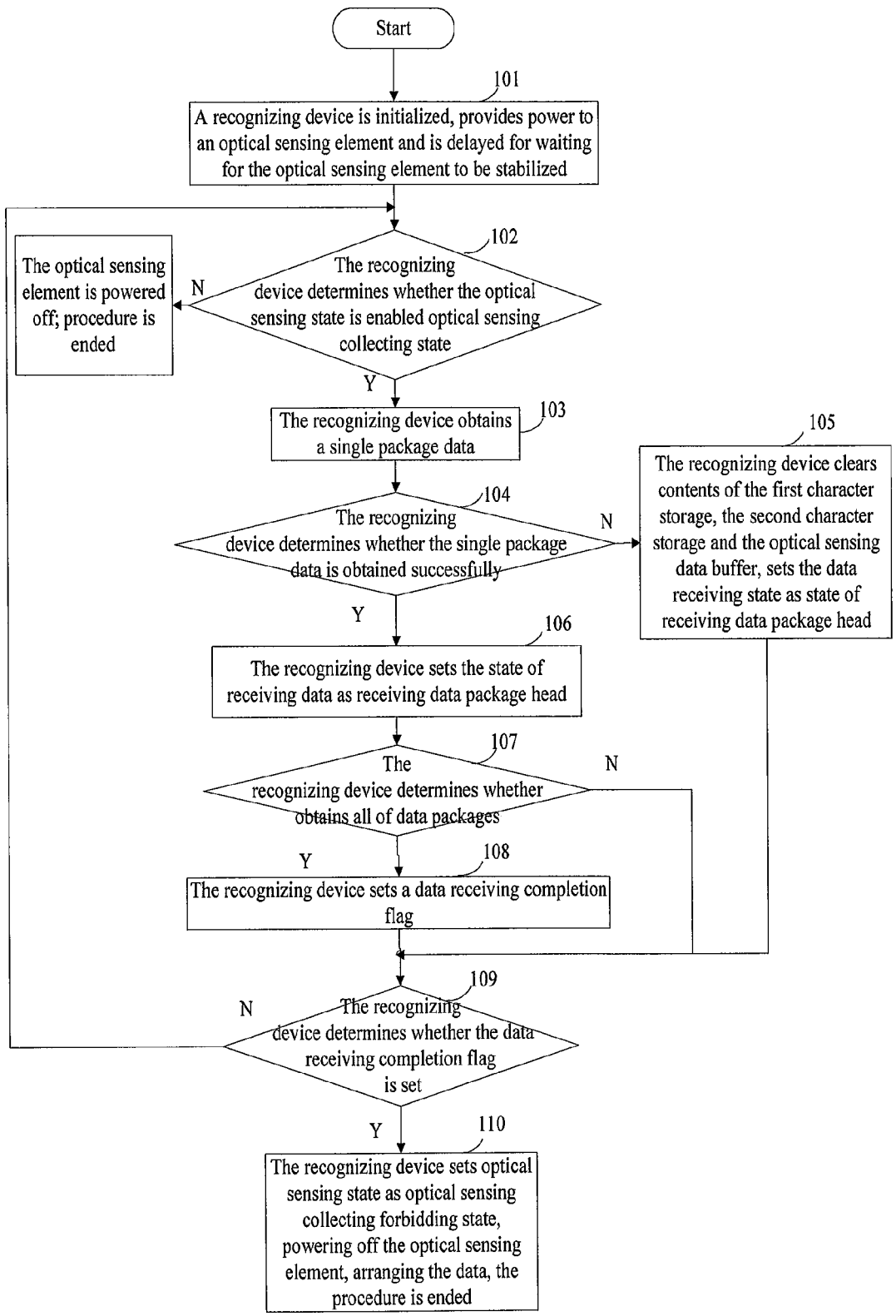
FIG. 2 is a flow chart of a method for recognizing optical signal provided by Embodiment 2 of the present invention.

Embodiment 2 provides a method for recognizing optical signal, as shown in FIG. 2, which comprises following steps.

Step 101, a recognizing device is initialized, provides power to an optical sensing element and is delayed for waiting for the optical sensing element to be stabilized;

Specifically, in Embodiment 2, initializing comprises that: the recognizing device sets optical sensing state as enabled optical sensing collecting state, clearing a timer, setting receiving data state as receiving data package head, clearing a first character storage, a second character storage, optical sensing data buffer, collecting array, voltage value array, converting storage, optical data storage, decoding storage and code unit storage; current offset, total package number, data length, data receiving number of the initialized optical data buffer and current AD voltage colleting times;

In Embodiment 2, the timer starts counting time when it is initialized; the recognizing device sets optical state as optical sensing collecting forbidding state; for example, the preset time is 60 seconds;

Step 102, the recognizing device determines whether the optical sensing state is enabled optical sensing collecting state, if yes, executing Step 103; otherwise, the optical sensing element is powered off, the procedure is ended;

Step 103, the recognizing device obtains a single package data;

Step 104, the recognizing device determines whether the single package data is obtained successfully; if yes, executing Step 106; otherwise, executing Step 105;

Specifically, in Embodiment 2, the recognizing device determines whether a second error flag is set, if yes, it represents that obtaining the single package data is failed; otherwise, it represents that obtaining the single package data is successful; in Step 101, performing initializing further comprises resetting the second error flag;

Step 105, the recognizing device clears contents of the first character storage, the second character storage and the optical sensing data buffer, sets the data receiving state as state of receiving data package head; executing Step 109;

Step 106, the recognizing device sets the state of receiving data as receiving data package head;

Step 107, the recognizing device determines whether obtains all of data packages; if yes, executing Step 108; otherwise, executing Step 109;

Specifically, in Embodiment 2, the recognizing device obtains current package number and total package number from the data package head, determines whether the number of data bit with value of 1 in the current package number is more than or equal to a total package number; if yes, it represents that all package data have been received; otherwise, it represents that not all of the package data have been received; specifically, in Embodiment 2, the current package number is represented in binary, the number of date bits of which is 1 in the current package number represents sequence number of currently obtained data package; For example, in Embodiment 2, the current package number is 0000 0000 0000 0011; there are two bits of 1 in the current package number, which represents that the currently obtained data package is the second package data.

Step 108, the recognizing device sets a data receiving completion flag;

Step 109, the recognizing device determines whether the data receiving completion flag is set, if yes, execute Step 110; otherwise, execute Step 102;

Step 110, the recognizing device sets optical sensing state as optical sensing collecting forbidding state, powering off the optical sensing element, arranging the data, the procedure is ended;

For example, in Embodiment 2, if the data received by the recognizing device is FE C8 11 06 31 FE 01 32 FE 01 33 FE 01 06 32, a data package is received by decoding; the content of the data package is 112233; if the data received by the recognizing device is FE C8 21 06 31 32 33 34 35 36 01 3B FE C9 22 07 61 62 63 64 65 66 67 FE 01 C3, two data packages are received by decoding, the content of the first data package is 123456, the content of the second data package is abcdefg; if the data received by the recognizing device is FE C8 31 06 31 32 33 34 35 36 01 3B FE C9 32 07 61 62 63 64 65 66 67 FE 01 C3 FE CA 33 06 E6 82 A8 E5 A5 BD 37 5D, three data packages are received by decoding, the content of the first data package is 123456, the content of the second data package is abcdefg, the content of the third data package is "hello".

Figure 3:
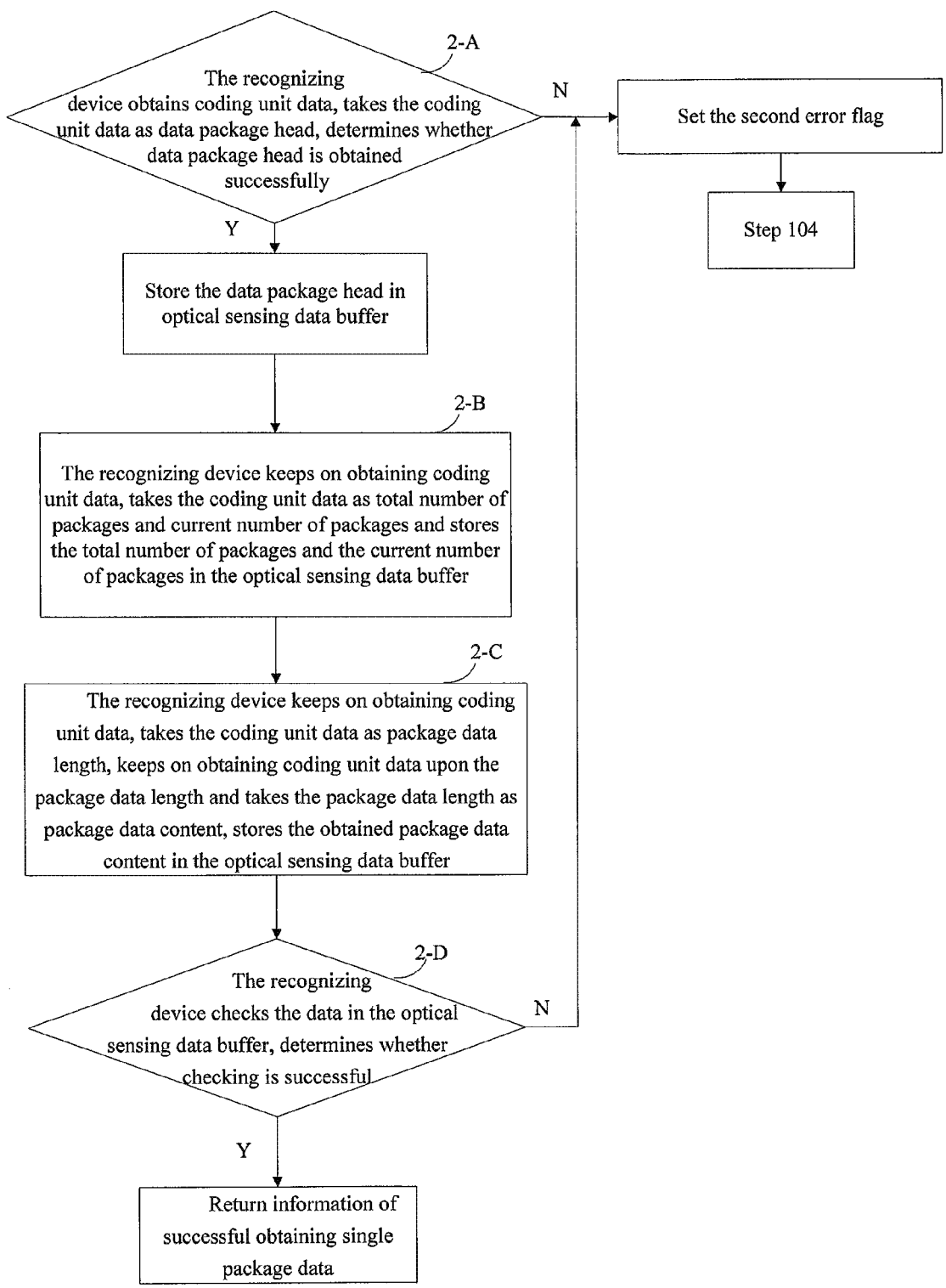
FIG. 3 is a flow chart of a method for obtaining single package data as shown in FIG. 2.

In this case, the method for obtaining a single package data, i.e. the method for obtaining the single package data by the recognizing device in Step 103, as shown in FIG. 3, includes:

Step 2-A, the recognizing device obtains code unit data, takes the code unit data as data package head, determines whether data package head is obtained successfully, if yes, storing the data package head in optical sensing data buffer and executing Step 2-B; otherwise, setting the second error flag and executing Step 104;

Specifically, in Embodiment 2, Step 2-A comprises:

Step 201, the recognizing device determines whether the data receiving state is receiving data package head, if yes, execute Step 202; otherwise, sets the second error flag, execute Step 104;

Specifically, in Embodiment 2, data receiving state is set to be receiving data package head at time of initializing;

Step 202, the recognizing device obtains code unit data, stores the code unit data in the first character storage; the recognizing device determines whether a first error flag is set, if yes, set the second error flag, execute Step 104; otherwise, execute Step 203;

Specifically, in Step 202 of Embodiment 2, the recognizing device takes the obtained code unit data as a data of one code unit length; preferably, one code unit length is 8 bits;

In Embodiment 2, setting the second error flag represents that receiving package data is error; the initial value of the second error flag is 0;

Step 203, the recognizing device determines whether the code unit data in the first character storage is a second preset coding byte, if yes, execute Step 204; otherwise execute Step 205;

For example, in Embodiment 2, the second preset coding byte includes FE;

Step 204, the recognizing device keeps on obtaining code unit data, storing the code unit data in the second character storage, the recognizing device determines whether the first error flag is set, if yes, sets the second error flag; execute Step 104; otherwise, execute Step 206;

Specifically, in Step 204 of Embodiment 2, the method for that the recognizing device keeps on obtain code unit data is identical to Step 202; the number of the code unit data obtained in Step 204 is related to number of bits of a first preset coding byte, of which specific relation is: the number of obtained code unit data obtained in Step 204 +1=number of digits of the first preset coding byte/length of one code unit data;

Step 205, the recognizing device sets the second character storage as 0; execute Step 206;

Step 206, the recognizing device combines and decodes the data in the first character storage and the data in the second character storage, determines whether the data after decoding is preset data package head, if yes, execute Step 207; otherwise, sets the second error flag; execute Step 104;

Specifically, in Embodiment 2, the preset data package head includes FE C8, FE C9, FE CA, FE CB, FE CC, FE CD;

Step 207, the recognizing device takes the decoded data as data package head, stores the decoded data at position corresponding to the current offset in the optical sensing data buffer and updates the current offset;

Specifically, in Embodiment 2, updating the current offset specifically includes adding 1 and the number of code unit data obtained in Step 204 to the current offset; in Embodiment 2, the initial value of the current offset is 0;

Step 2-B, the recognizing device keeps on obtaining code unit data, takes the code unit data as total number of packages and current number of packages and stores the total number of packages and the current number of packages in the optical sensing data buffer;

Specifically, in Embodiment 2, Step 2-B includes:

Step 209, the recognizing device keeps on obtaining code unit data, stores the code unit data in the first character storage; the recognizing device determines whether the first error flag is set, if yes, sets the second error flag and execute Step 104; otherwise, execute Step 210;

Specifically, in Step 209 of Embodiment 2, the method for the recognizing device keeps on obtaining code unit data is identical to Step 202; in Step 202, the number of obtaining code unit data is related to the length of one code unit data and total number of data packages, of which specific relation includes total number of data packages is less than or equal to product of number of code unit data obtained in Step 209 and $$2^{\frac{length\ of\ one\ code\ unit\ data}{2}};$$

Step 210, the recognizing device determines whether total package number is 0, if yes, execute Step 212; otherwise, execute Step 211;

In Embodiment 2, the recognizing device sets the total package number as 0 at the time of initializing;

Step 211, the recognizing device determines whether total number is value of a first preset position, if yes, execute Step 213; otherwise, sets the second error flag and execute Step 104;

Specifically, in Embodiment 2, the first preset position is high bit part of the data in the first character storage, e.g. the value of the first preset position in the first character storage is data, which is started from the most significant bit in the first character storage, with length of product of number of the code unit data obtained in Step 209 and data of one code unit;

Step 212, the recognizing device assigns total package number as the value of the first preset position of the data in the first character storage; execute Step 213;

For example, in Embodiment 2, the data in the first character storage is 31, in Step 212, the total number of packages is assigned with value of 3;

Step 213, the recognizing device obtains a current bit of the current package number according to the value of a second preset position, determines whether the current bit of the current number of packages is 0, if yes, execute Step 214; otherwise, sets the second error flag, execute Step 104;

Specifically, in Embodiment 2, the second preset position is low bit part of the data in the first character storage, e.g. the part except for the first preset position in the first character storage;

For example, in Embodiment 2, the initial value of the current bit of the current number of packages is the $0^{th}$ bit of the current number of packages;

Step 214, the recognizing device sets the data on the current bit of the current number of packages as 1, updates the current bit of the current number of packages;

Specifically, in Embodiment 2, if the current number of packages is 0000 0000 0000 0001, it represents that the data package obtained currently is a first package of data; if the current number of packages is 0000 0000 0000 0111, it represents that the data package obtained currently is a third package of data; the current bit of the current number of packages specifically is setting the high bit next to a bit of which the value is set as 1 in the current package number as updated current bit;

Step 215, the recognizing device stores the data of the second preset position in the first character storage at the position corresponding to the current offset in the optical sensing data buffer and update the current offset;

Specifically, in the present step of Embodiment 2, updating the current offset specifically includes adding 1 to the current offset if result of the number of code unit data obtained in Step 209/2 is less than or equal to 1; adding result of number of code unit data obtained in Step 209/2 to the current offset if the result of the number of code unit data obtained in Step 209/2 is more than 1;

Step 2-C, the recognizing device keeps on obtaining code unit data, takes the code unit data as package data length, keeps on obtaining code unit data upon the package data length and takes the package data length as package data content, stores the obtained package data content in the optical sensing data buffer;

Specifically, in Embodiment 2, Step 2-C includes:

Step 216, the recognizing device keeps on obtaining code unit data and stores the code unit data in the first character storage; the recognizing device determines whether the first error flag is set, if yes, sets the second error flag and execute Step 104; otherwise, execute Step 217;

Specifically, in Step 216 of Embodiment 2, the method for keeping on obtaining code unit data by the recognizing device is identical to Step 202; the number of the code unit data obtained in Step 216 is related to the length of one code unit data and total length of data, of which specific relation is that result of total length of data/total length data is less than or equal to −1.

Step 217, the recognizing device stores the data in the first character storage at position corresponding to the current offset in the optical sensing data buffer and updates the current offset;

Specifically, in Step 217 of Embodiment 2, updating the current offset specifically is adding the current offset to the number of the code unit data obtained in Step 216;

Step 218, the recognizing device sets the data length as value in a first character storage, sets the first flag as 0 and sets the number of obtaining data as 0;

Step 219, the recognizing device determines whether the obtained number of data is less than the data length, if yes, execute Step 220; otherwise, execute Step 2-D;

Step 220, the recognizing device obtains code unit data and stores the code unit data in the first character storage; the recognizing device determines whether the first flag is set, if yes, set the second error flag and execute Step 104; otherwise, execute Step 221;

Specifically, in Step 220 of Embodiment 2, the method for keeping on obtaining data by the recognizing device is identical to Step 202; the number of obtaining code unit data in Step 202 is 1;

Step 221, the recognizing device stores the data in the first character storage at the position corresponding to the current offset in the optical sensing data buffer, updates the current offset and updates and obtains number of data; execute Step 219;

Specifically, in Step 221 of Embodiment 2, updating the current offset specifically includes adding 1 to the current offset; updating and obtaining number of data specifically includes adding 1 to the obtained number of data;

Step 2-D, the recognizing device checks the data in the optical sensing data buffer, determines whether checking is successful; if yes, returns information of successful obtaining single package data; otherwise, sets the second error flag, execute Step 104.

Figure 4:
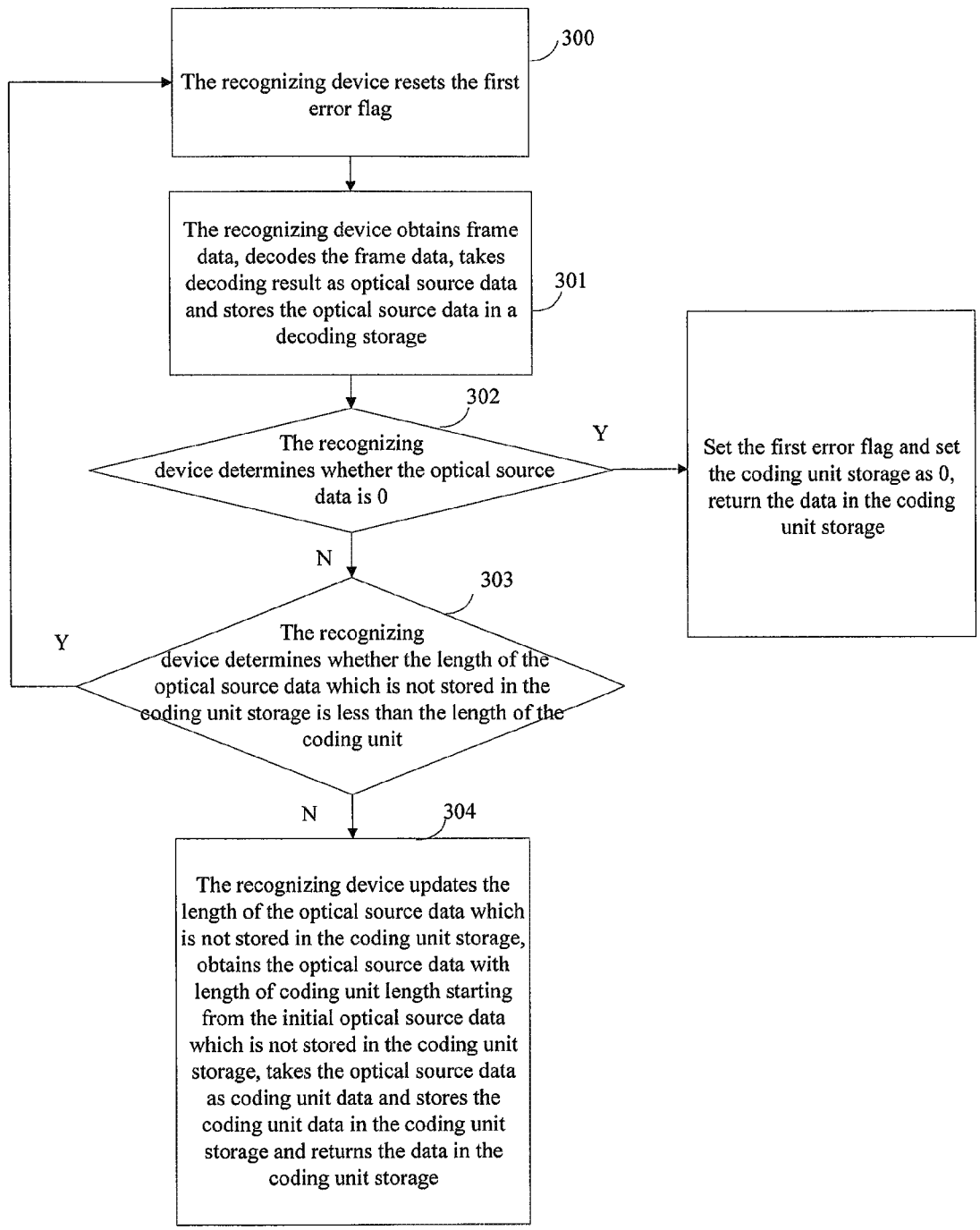
FIG. 4 is a flow chart of a method for obtaining and decoding a code unit data in FIG. 3.
Figure 5:
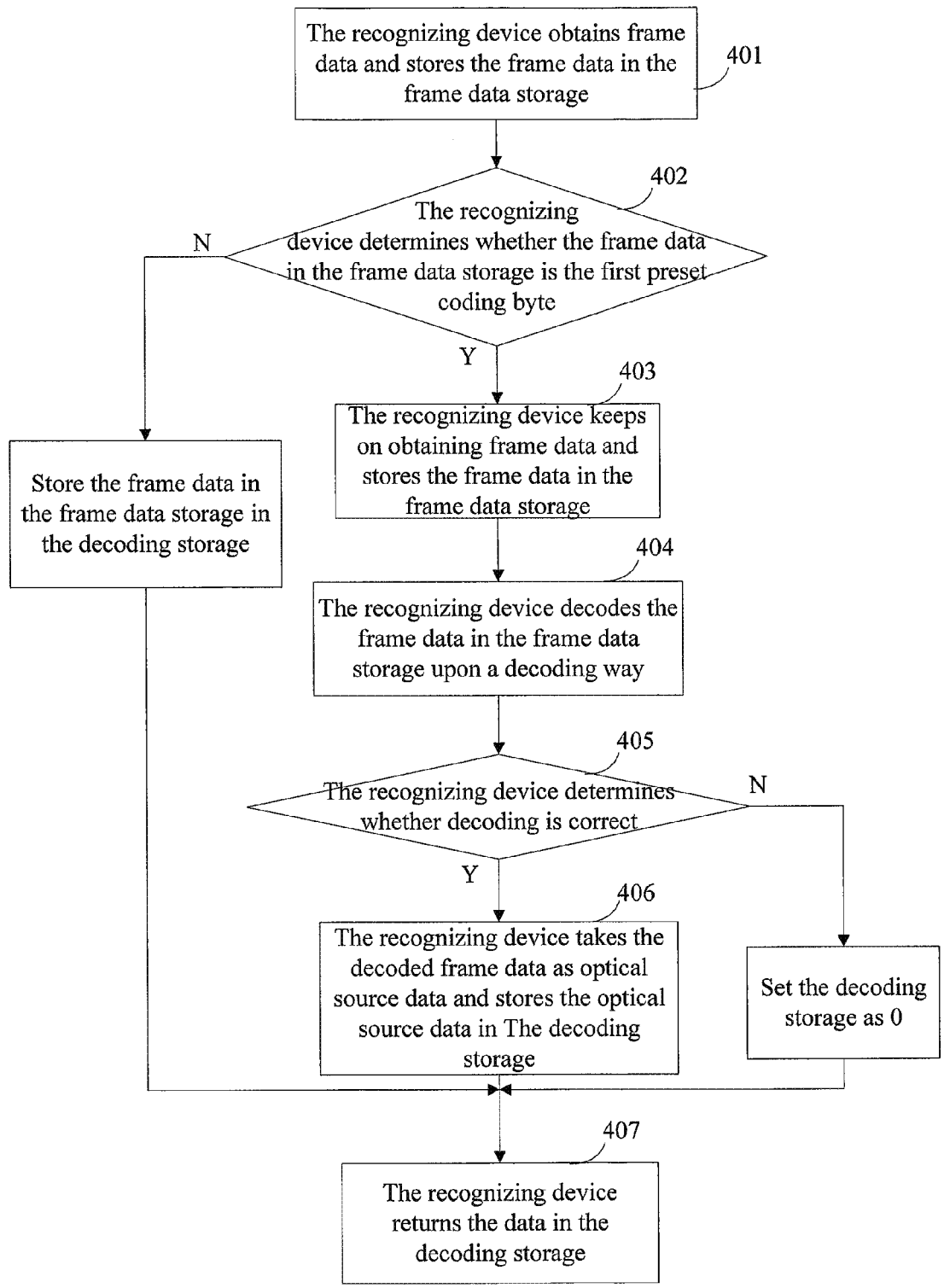
FIG. 5 is a flow chart of a method for obtaining and decoding frame data to obtain optical source data in FIG. 4.
Figure 6:
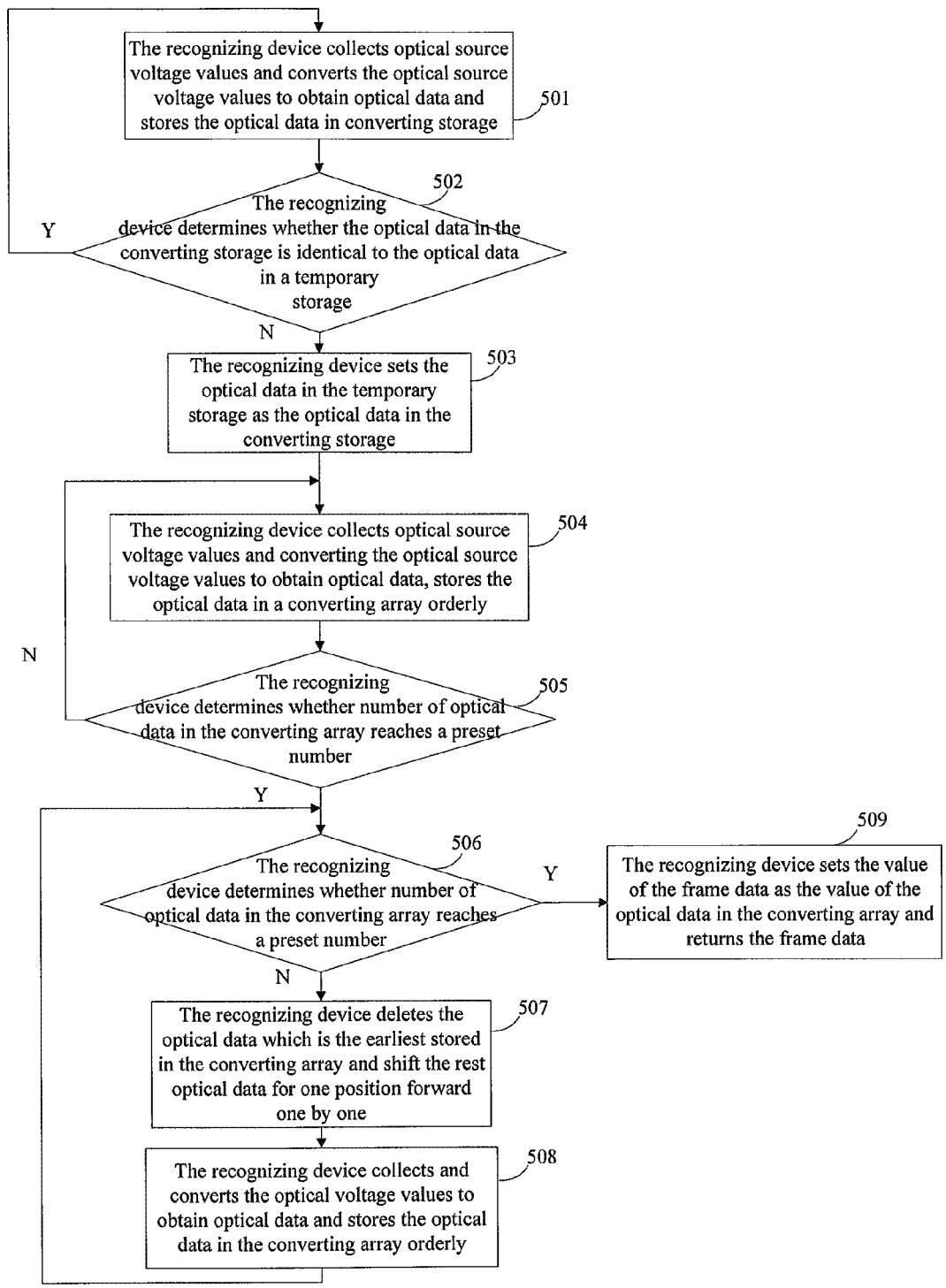
FIG. 6 is a flow chart of a method for obtaining frame data as shown in FIG. 5.
Figure 7:
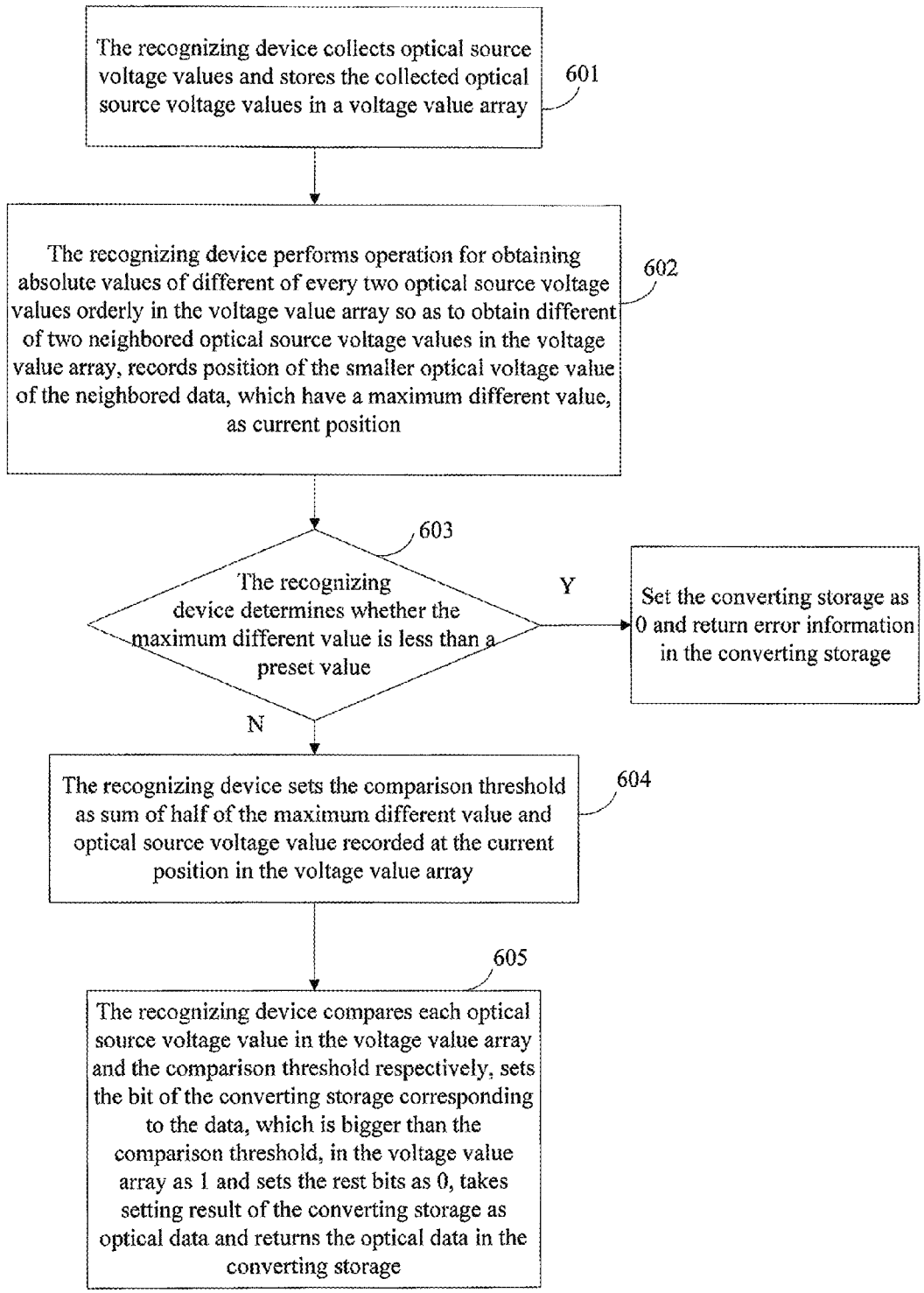
FIG. 7 is a flow chart of a method for collecting and converting optical source voltage value to obtain optical data in FIG. 6.
Figure 8:
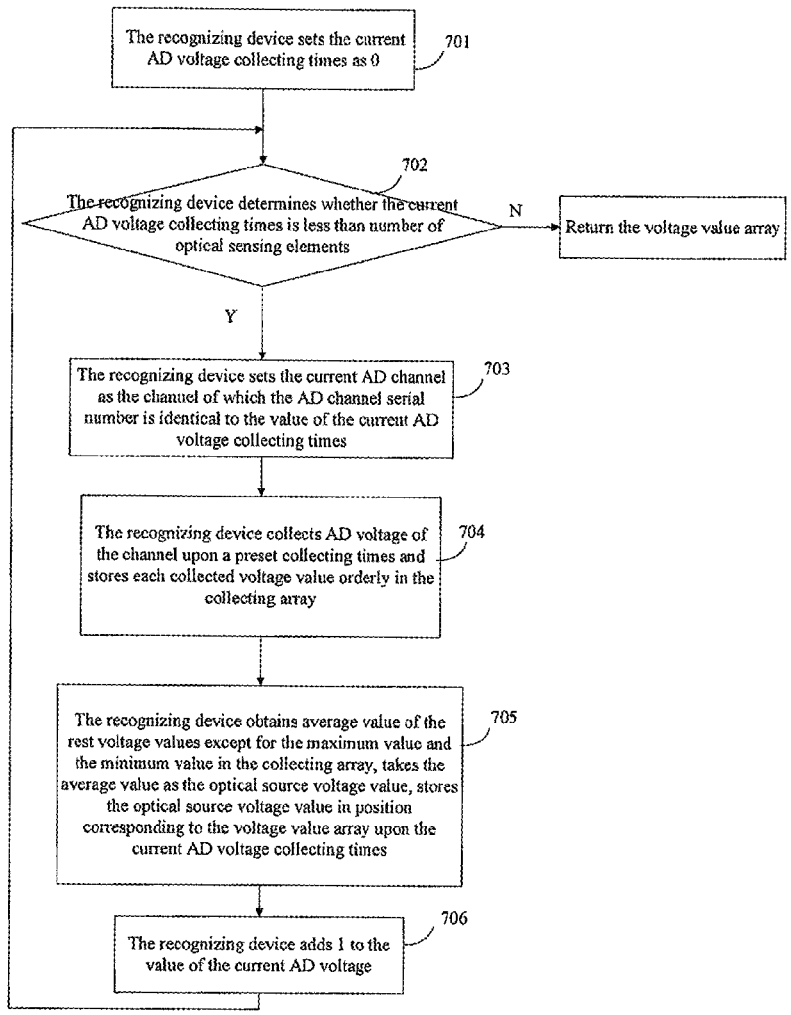
FIG. 8 is a flow chart of a method for collecting optical source voltage value in FIG. 7.

In this case, the method for obtaining and decoding one code unit data is method for obtaining code unit data by the recognizing device in Step 202, Step 204, Step 208, Step 216 and Step 220; as shown in FIG. 4, the method includes:

Step 300, the recognizing device resets the first error flag;

Specifically, in Embodiment 2, the initial value of the first error flag is 0;

Step 301, the recognizing device obtains frame data, decodes the frame data, takes decoding result as optical source data and stores the optical source data in a decoding storage;

In Embodiment 2, the length of the optical source data is number of optical sensing element;

Step 302, the recognizing device determines whether the optical source data is 0, if yes, sets the first error flag and sets the code unit storage as 0, returns the data in the code unit storage; otherwise, execute Step 303;

Specifically, in Embodiment 2, that the optical data is 0 represents that receiving is error; that the first error flag is set represents that code unit error is error; the initial value of the first error flag is 0;

Step 303, the recognizing device determines whether the length of the optical source data which is not stored in the code unit storage is less than the length of the code unit, if yes, go back to Step 300; otherwise, execute Step 304;

Step 304, the recognizing device updates the length of the optical source data which is not stored in the code unit storage, obtains the optical source data with length of code unit length starting from the initial optical source data which is not stored in the code unit storage, takes the optical source data as code unit data and stores the code unit data in the code unit storage and returns the data in the code unit storage;

Specifically, in Embodiment 2, the length of the optical data which is not stored in the code unit storage specifically is: length of the data which is not returned plus the length of decoding result minus length of data of one code unit;

In this case, the method for obtaining and decoding frame data to obtain optical source data, e.g. obtaining the frame data by the recognizing device, decoding the frame data, taking decoding result as optical source data and stores the decoding result in the decoding storage in Step 301, as shown in FIG. 5, includes:

Step 401, the recognizing device obtains frame data and stores the frame data in the frame data storage;

In Embodiment 2, the length of the frame data is number of optical sensing elements;

Step 402, the recognizing device determines whether the frame data in the frame data storage is the first preset coding byte, if yes, execute Step 403; otherwise, stores the frame data in the frame data storage in the decoding storage, execute Step 407;

For example, in Embodiment 2, the number of the optical sensing elements is 8;

Step 403, the recognizing device keeps on obtaining frame data and stores the frame data in the frame data storage;

Step 404, the recognizing device decodes the frame data in the frame data storage upon a decoding way;

Step 405, the recognizing device determines whether decoding is correct, if yes, execute Step 406; otherwise, sets the decoding storage as 0 and execute Step 407;

Step 406, the recognizing device takes the decoded frame data as optical source data and stores the optical source data in decoding storage;

Step 407, the recognizing device returns the data in the decoding storage;

In this case, the method for obtaining frame data, i.e. in Step 401 and Step 403, the method for obtaining frame data by the recognizing device and storing the frame data in the frame data storage, as shown in FIG. 6, includes:

Step 501, the recognizing device collects optical source voltage values and converts the optical source voltage values to obtain optical data and stores the optical data in converting storage;

In Embodiment 2, the data length of the optical data is number of optical sensing elements;

Step 502, the recognizing device determines whether the optical data in the converting storage is identical to the optical data in a temporary storage, if yes, go back to Step 501; otherwise, execute Step 503;

Specifically, in Embodiment 2, the optical data stored in the temporary storage is the optical data obtained by last time of converting;

In Embodiment 2, initializing the recognizing device further comprises that the recognizing device initiates a first timer; thus when the recognizing device determines that the optical data in the converting storage is identical to the optical data in a temporary storage, Step 502 further comprises that the recognizing device determines whether the time of the first timer reaches a first preset time, if yes, returning error information; otherwise, go back to Step 501;

Step 503, the recognizing device sets the optical data in the temporary storage as the optical data in the converting storage;

Step 504, the recognizing device collects optical source voltage values and converting the optical source voltage values to obtain optical data, stores the optical data in a converting array orderly;

Step 505, the recognizing device determines whether number of optical data in the converting array reaches a preset number, if yes, go to Step 506; otherwise, go back to Step 504;

For example, in Embodiment 2, number of the optical sensing elements is 8 and the preset number is 4; the optical data is stored in the converting array according to the order of obtaining the optical data, i.e. the optical data in the converting array is 00111001, 00111001, 00110001 and 00110001;

Step 506, the recognizing device determines whether the respective optical data in the converting array are identical, if yes, execute Step 509; otherwise, execute Step 507;

In Embodiment 2, Step 504 comprises the recognizing device initiates a second timer; thus in Step 504 of Embodiment 2, when the recognizing device determines that the respective optical data in the converting array are not identical, Step 506 further includes that the recognizing device determines whether the time of the second timer reaches a second preset time, if yes, return error information; otherwise, execute Step 507;

Step 507, the recognizing device deletes the optical data which is the earliest stored in the converting array and shift the rest optical data forward one position one by one; For example, in Embodiment 2, the first optical data 00111001, which is the earliest stored in the converting array, is deleted; then the optical data in the converting array becomes 00111001, 00110001 and 00110001;

Step 508, the recognizing device collects and converts the optical voltage values to obtain optical data and stores the optical data in the converting array orderly; execute Step 506;

For example, in Step 508 of Embodiment 2, the obtained optical data is 00110001; the optical data in the converting array becomes 00111001, 00110001, 00110001 and 00110001;

Step 509, the recognizing device sets the value of the frame data as the value of the optical data in the converting array and returns the frame data;

For example, in Embodiment 2, if the optical data in the converting array are all 00110001, 00110001 is stored as frame data in frame data storage;

In this case, the method for collecting and converting optical source voltage value to obtain optical data is identical to method for collecting and converting the optical source voltage values by the recognizing device in Step 501, Step 505 and Step 508. As shown in FIG. 7, the method includes:

Step 601, the recognizing device collects optical source voltage values and stores the collected optical source voltage values in a voltage value array;

For example, in Embodiment 2, the number of the optical sensing elements is 8; the optical source voltage values in the voltage value array are 99, 100, 698, 699, 98, 102, 101, 701;

Step 602, the recognizing device performs operation for obtaining absolute values of difference of every two optical source voltage values orderly in the voltage value array so as to obtain difference of two neighbored optical source voltage values in the voltage value array, records position of the smaller optical voltage value of the neighbored data, which have a maximum different value, as current position;

For example, in Embodiment 2, the different values of neighbored optical source voltage values in the voltage value array are 1, 598, 1, 601, 3, 1, 600, of which the maximum different value is 601; the position of the smaller data in the neighbored optical voltage values which have the maximum different value is the fifth digit;

Step 603, the recognizing device determines whether the maximum different value is less than a preset value, if yes, sets the converting storage as 0 and returns error information in the converting storage; otherwise go to Step 604;

Specifically, in Embodiment 2, the number of bits which are set as 0 is number of optical sensing elements;

Step 604, the recognizing device sets the comparison threshold as sum of half of the maximum different value and optical source voltage value recorded at the current position in the voltage value array;

For example, in Embodiment 2, the data at the current position is 98, the comparison threshold is 98+601×0.5=399;

Step 605, the recognizing device compares each optical source voltage value in the voltage value array and the comparison threshold respectively, sets the bit of the converting storage corresponding to the data, which is bigger than the comparison threshold, in the voltage value array as 1 and sets the rest bits as 0, takes setting result of the converting storage as optical data and returns the optical data in the converting storage;

Specifically, in Embodiment 2, the number of bits of data in the converting storage is number of optical sensing elements;

For example, in Embodiment 2, the recognizing device sets the bit corresponding to 698, 699, 701 in the voltage value array of the converting storage and sets the rest bits as 0, the optical data in the converting storage is 00110001;

In Embodiment 2, if the different value between the collected AD voltage, e.g. data in the voltage value array, is smaller, the electrical signal transported in Embodiment 2 is not in one color, e.g. full black or full white;

Besides, the method for collecting and converting optical source voltage value and obtaining the optical data includes:

Step B1-0, the recognizing device collects optical source voltage value and stores the collected optical source voltage values in the voltage value array;

For example, in Embodiment 2, the optical source voltage value in the voltage value array are 99, 100, 698, 699, 98, 102, 101, 701;

Step B1-1, the recognizing device compares each optical source voltage value in the voltage value array with a preset comparison threshold one by one, if the current optical source voltage value is more than or equal to the preset comparison threshold, sets the bit corresponding to the current optical source voltage value in the converting storage as 1; if the current optical source voltage value is smaller than a preset comparison threshold value, set the bit corresponding to the current optical source voltage value of the converting storage as 0 and sets setting result of the converting storage as optical data;

For example, in Embodiment 2, the preset comparison threshold is 400, the bits, which is corresponded to 698, 699, 701 in the voltage value array, in the converting storage are set as 1, the rest of the bits are set as 0 and the optical data in the converting storage is 00110001;

In addition, the method for collecting and converting optical source voltage value and obtaining optical data includes:

Step B2-0, the recognizing device collects optical source voltage values and stores the collected optical source values in the voltage value array;

For example, in Embodiment 2, the optical source voltage values in the voltage value array are 99, 100, 698, 699, 98, 102, 101, 701;

Step B2-1, the recognizing device computes the optical source voltage values in the voltage value array and takes computing result as comparison threshold;

Specifically, in Embodiment 2, performing operation on the optical source voltage values in the voltage value array comprises obtaining average value of the maximum value and the minimum value in the optical source voltage values in the voltage value array or obtaining average value of the optical source voltage values in the voltage value array;

For example, in Embodiment 2, the average value, which is obtained by the recognizing device, of the optical source voltage values in the voltage value array device is 325, thus the comparison threshold is 325;

Step B2-2, the recognizing device determines whether the comparison threshold is in a preset category, if yes, execute Step B2-3; otherwise, stores error information in the converting storage and returns error information in the converting storage;

For example, in Embodiment 2, the preset category is more than 200 and less than 600;

Step B2-3, the recognizing device compares each optical source voltage value in the voltage value array with the comparison threshold, sets the bit of the current optical source voltage value, which is more than the comparison threshold, in the converting storage, resets the rest bits, and takes the setting result of the converting storage as optical data;

For example, in Embodiment 2, the comparison threshold is 325; the bits, which are corresponding to 698, 699, 701 of the voltage value array, in the converting storage are set as 1 and the reset bits are set as 0; the optical data in the converting storage is 00110001;

In this case, the method for collecting optical source voltage values, e.g. the method for collecting optical source voltage values, by the recognizing device, and storing the collected optical source voltage values in the voltage value array in Step 601, as shown in FIG. 8, includes:

Step 701, the recognizing device sets the current AD voltage collecting times as 0;

Step 702, the recognizing device determines whether the current AD voltage collecting times is less than number of optical sensing elements, if yes, go to Step 703; otherwise, returns the voltage value array;

For example, the number of the optical sensing elements is 8; after collecting AD voltage for 8 times, the data in the voltage value array is 99, 100, 698, 699, 98, 102, 101, 701;

Step 703, the recognizing device sets the current AD channel as the channel of which the AD channel serial number is identical to the value of the current AD voltage collecting times;

For example, in Embodiment 2, the current AD voltage collecting times is 1, the current AD channel is the first AD channel;

Step 704, the recognizing device collects AD voltage of the channel upon a preset collecting times and stores each collected voltage value orderly in the collecting array;

For example, in Embodiment 2, the current AD voltage collecting times is 1, the preset collecting times is 6; the voltage values of the first AD channel are collected for 6 times so as to obtain collecting result of 95, 97, 101, 100, 98, 104;

Step 705, the recognizing device obtains average value of the rest voltage values except for the maximum value and the minimum value in the collecting array, takes the average value as the optical source voltage value, stores the optical source voltage value in position corresponding to the voltage value array upon the current AD voltage collecting times;

For example, in Embodiment 2, the current AD voltage collecting times is 1; the data in the current voltage value array is: 95, 97, 101, 100, 98, 104; the average of the rest data except for the maximum value and the minimum value is 99; 99 is stored in the first bit of the voltage value array;

In addition, the recognizing device further can compute average value of voltage values in the collecting array and takes the average value as optical source voltage value, compute sum of the voltage values in the collecting array, take the sum as the optical source voltage value, compute the sum of the values except for the maximum value and the minimum value in the collecting array and take the sum as the optical source voltage value;

Step 706, the recognizing device adds 1 to the value of the current AD voltage; go back to Step 702;

In addition, the method for collecting optical source voltage value can include:

Step A1-1, the recognizing device sets a collecting channel of which the voltage value has not been collected as current collecting channel;

For example, in Embodiment 2, the recognizing device sets the first collecting channel as current collecting channel;

Step A1-2, the recognizing device collects the voltage value in the current collecting channel, takes the collected voltage value as optical source voltage value and stores the optical source voltage value at the position corresponding to the current collecting channel in the collecting array;

For example, in Embodiment 2, the first collecting channel is the current collecting channel, the voltage value of the first collecting channel is collected and the collected voltage value is 99, e.g. the optical source voltage value of the first collecting channel is 99 and 99 is stored at the first position of the collecting array;

Step A1-3, the recognizing device determines whether the voltage values of all collecting channels are collected, if yes, collecting is ended; otherwise, updating the current collecting channel; go back to Step A1-2;

Specifically, in Embodiment 2, updating the current collecting channel specifically includes that the recognizing device takes one of the collecting channel in the collecting channels of which voltage values have not been collected as the current collecting channel;

In addition, the method for collecting optical source voltage value can include:

Step A2-1, the recognizing device sets one of the collecting channels as the current collecting channel;

For example, in Embodiment 2, the recognizing device takes the first collecting channel as current collecting channel;

Step A2-2, the recognizing device collects the voltage values of the current collecting channel, performs operation on the collected voltage values and a first preset base value, takes operation result as optical source voltage value and stores the optical source voltage values at the position corresponding to the current collecting channel in the collecting array;

Specifically, in Embodiment 2, performs operation of add, subtract, multiply, divide or power operation;

For example, in Embodiment 2, the first preset base value is 3, perform multiply operation on the collected voltage value and the first preset base value; the first collecting channel is the current collecting channel, the voltage value of the first collecting channel is collected and the collected voltage value is 33; thus the optical source voltage value is 33×3=99 and 99 is stored at the first position in the collecting array;

Step A2-3, the recognizing device determines whether voltage values of all collecting channels have been collected, if yes, collecting is ended; otherwise, updating the current collecting channel; go back to Step A2-2;

Specifically, in Embodiment 2, updating the current collecting channel specifically includes that the recognizing device sets one of the collecting channels of which voltage values have not been collected as current collecting channel;

In addition, the method for collecting optical source voltage value can include

Step A4-1, the recognizing device sets one of the collecting channels as current collecting channel;

For example, in Embodiment 2, the recognizing device sets the first collecting channel as current collecting channel;

Step A4-2, the recognizing device collects voltage value of the current collecting channel upon the preset collecting times, stores the collected preset collecting times of voltage values in the collecting array;

For example, in Embodiment 2, the first preset collecting channel is current collecting channel, the preset collecting times is 6; the voltage values of the first collecting channel are collected for 6 times and collecting result is 95, 97, 101, 100, 98, 104;

Step A4-3, the recognizing device performs the preset collecting times of voltage values in the collecting array and the second preset base value, takes the operation result as optical source voltage value and stores the optical source voltage value at the position corresponding to the current collecting channel in the voltage value array;

Specifically, in Embodiment 2, performing operation on the preset collecting times of voltage values in the collecting array and the second preset base value includes performing operation, such as add, subtract, multiply, power operation or computing average value, on the preset collecting times of voltage values in the collecting array and the second preset base value;

For example, in Embodiment 2, the second preset base value is 2; the recognizing device computes average value of the preset collecting times of voltage values; the obtained average value is 99; multiply operation is performed on the average value and the second preset base value, e.g. the optical source voltage value is 99×2=198; 198 is stored on the first position in the collecting array;

Step A4-4, the recognizing device determines whether the voltage values of all collecting channels have been collected; if yes, the collecting is ended; otherwise, updating the current collecting channel; go back to Step A4-2.

A method for recognizing optical signal, comprising:

Step S0, initializing a device of recognizing optical signal;

Step S1, collecting an optical source voltage value in a collecting channel, obtaining a set of optical source voltage values, and storing the collected set of optical source voltage values into a voltage value array;

Step S2, comparing the set of optical source voltage values with a comparison threshold, and generating optical data according to comparing result;

Step S3, determining whether the optical data is identical to the optical data obtained by last time of converting, if yes, going back to Step S1; otherwise, going to Step S4;

Step S4, collecting optical source voltage values in the collecting channel, obtaining a set of optical source values, comparing the set of optical source values with the comparison threshold, generating optical data according to comparison result, and storing the optical data into a conversion array orderly;

Step S5, determining whether the number of the optical data in the conversion array reaches a preset number, if yes, executing Step S6; otherwise, executing StepS4;

Step S6, determining whether respective optical data in the conversion array are identical, if yes, executing Step S8; otherwise, executing Step S7;

Step S7, deleting the optical data which is the earliest stored in the conversion array, and going back to Step S4; and Step S8, setting frame data as the optical data in the conversion array, and returning the frame data.

The method, wherein collecting optical source voltage values in the collecting channel specifically comprises:

Step A1-1, setting a collecting channel which is not yet collected in the collecting channels as a current collecting channel;

Step A1-2, collecting the voltage value in the current collecting channel, taking the collected voltage value as the optical source voltage value, and storing the optical source voltage value at the position corresponding to the current collecting channel in the collecting array;

Step A1-3, determining whether the voltage values of all the collecting channels have been collected, if yes, collecting is ended; otherwise, updating the current collecting channel and going back to Step A1-2; or Step A2-1, setting the collecting channel which is not yet collected in the collecting channels as the current collecting channel;

Step A2-2, collecting the voltage values of the current collecting channel, performing operation on the collected voltage value and a first preset baseline value, taking operation result as optical source voltage value, and storing the optical source voltage value at the position corresponding to the current collecting channel in the collecting array;

Step A2-3, determining whether the voltage values of all the collecting channels have been collected, ending collection if the voltage values of all the collecting channels have been collected; otherwise, updating the current collecting channel and going back to Step A2-2; or Step A3-1, setting the collecting channel which is not yet collected in the collecting channels as the current collecting channel;

Step A3-2, collecting the voltage value of the current collecting channel according to a preset collecting times, and storing a preset collecting times of collected voltage values in a collecting array orderly;

Step A3-3, performing operation on the preset collecting times of voltage values in the collecting array, setting the operation result as optical source voltage value, and storing the optical source voltage value at the position corresponding to the current collecting channel in the voltage value array;

Step A3-4, determining whether voltage values of all collecting channels have been collected; if yes, collecting is ended; otherwise, updating the current collecting channel and going back to Step A3-2; or Step A4-1, setting a collecting channel which has not yet been collected in the collecting channels as the current collecting channel;

Step A4-2, collecting the voltage value of the current collecting channel according to the preset collecting times, and storing the preset collecting times of the collected voltage values in the collecting array;

Step A4-3, performing operation on the preset collecting times of voltage values in the collecting array and a second preset baseline value; taking operation result as optical source voltage value, and storing the operation result in the position corresponding to the current collecting channel in the voltage value array;

Step A4-4, determining whether the voltage values of all collecting channels have been collected, if yes, collecting is ended; otherwise, updating the current collecting channel and going back to Step A4-2.

The method, wherein comparing the set of optical values with the comparison threshold and generating an optical data according to the comparison result specifically comprises:

Step B1-1, comparing each optical source voltage value in the set of optical source voltage values with the preset comparison threshold orderly, if the current optical source voltage value is greater than or equal to the preset comparison threshold, setting a bit corresponding to the current optical voltage value in converting storage; if the current optical source voltage value is less than the preset comparison threshold, resetting the bit corresponding to the bit corresponding to the current optical source voltage value in the converting storage, and taking the setting result in the converting storage as optical data; or Step B2-1, performing operation on the set of optical source voltage values, and taking operation result as comparison threshold;

Step B2-2, determining whether the comparison threshold is in a preset category, if yes, executing Step B2-3; otherwise, storing error information in the converting storage, and going back to the error information in the converting storage;

Step B2-3, comparing each optical source voltage value in the voltage value array with the comparison threshold, setting the bit corresponding to the current optical source voltage value, which is greater than the comparison threshold, in the converting storage, and resetting the reset bits; setting the setting result in the converting storage as optical data; or Step B3-1, calculating absolute value of difference of every two adjacent data in the voltage value array orderly to obtain difference of every two adjacent data in the voltage value array, taking the position of the smaller data in the two adjacent data which have a maximum difference as current position;

Step B3-2, determining whether the maximum difference is less than a preset difference, storing converting error information in the converting storage, returning the error information in the converting storage; otherwise executing Step B3-3;

Step B3-3, setting the comparison threshold as sum of half of the maximum difference and the data at the current position in the voltage value array; and Step B3-4, comparing each optical source voltage value in the voltage value array and the comparison threshold respectively, setting the bit corresponding to the optical source voltage value, which is greater than the comparison threshold, in the voltage value array and the converting storage, resetting the rest bits, and taking the setting result in the converting storage as optical data.

The method, wherein Step S0 comprises: the initializing a first timer, when the determining in Step S3 is yes, determining whether the time of the first timer reaches a preset time, if yes, returning error information; otherwise going back to StepS1.

The method, wherein Step S4 further comprises: the initializing the second timer;

when the determining in Step S6 is no, determining whether the time of the timer reaches a second preset time, if yes, returning error information; otherwise executing Step S7.

The method, wherein after that the determining in Step S8 is no, the method further comprises:

Step D1, determining whether the frame data is a first preset coding byte, if yes, executing Step D2; otherwise, storing the frame data as optical source data in decoding storage, going to Step D5;

Step D2, keeping on obtaining frame data, storing the obtained frame data in the optical data storage;

Step D3, decoding the frame data in the optical data storage in a decoding way and determining whether the decoding is successful, if yes, executing Step D4; otherwise, storing error information in the decoding storage and executing Step D5;

Step D4, storing the decoded frame data as optical source data in the decoding storage, and executing Step D5; and Step D5, returning the data in the decoding storage.

The method, wherein after Step D5, the method further comprises:

Step E0, resetting a first error flag;

Step E1, determining whether the data in the decoding storage is decoding error information, resetting the first error flag, storing the error information in the decode unit storage; otherwise, going to Step E2;

Step E2, determining whether the length of the optical source data, which is not stored in the code unit storage, in the code storage is less than the length of the code unit, if yes, going back to Step E3; otherwise going to Step E4;

Step E3, keeping on obtaining optical source data, storing the optical source data in the decoding storage, and going back to Step E1; and Step E4, taking the optical source data, of which the length is code unit length, obtained from the start position of the optical source data, which is not stored in the code unit storage, in the decoding storage as code unit data, and storing the code unit data in the code unit storage.

The method, wherein when the determining in Step E1 is yes and after Step E4, the method further comprises:

Step G0, obtaining single package data;

Step G1, determining whether a second error flag is set, if yes, executing Step G2; otherwise executing Step G3;

Step G2, clearing content of a first character storage, a second character storage, and an optical data buffer, setting data receiving state as state of receiving data package head, and going back to Step G0;

Step G3, setting the data receiving state as the state of receiving data package head, and going to Step G4;

Step G4, determining whether all of data package has been received, if yes, ending the process; otherwise going back to Step G0.

The method, wherein obtaining single package data specifically comprises:

Step F1, obtaining data in the code unit storage, taking the data in the code unit storage as data package head, determining whether data package head is obtained successfully, if yes, storing the data package head in the optical data buffer and going to Step F2; otherwise, setting the second error flag and going to Step G1;

Step F2, keeping on obtaining code unit data, taking the code unit data as total package number and current package number, and storing the total package number and the current package number in the optical data buffer;

Step F3, keeping on obtaining code unit data, taking the code unit data as package data length, keeping on obtaining code unit number as package data content according to the package data length, and storing the obtained package data content in the optical data buffer;

Step F4, checking the data package in the optical data buffer, and determining whether checking is successful, if yes, returning receiving correction information and going to Step G1; otherwise, setting the second error flag and going to Step G1.

The method, wherein Step F1 comprises:

Step F1-1, determining whether the data receiving state is state of receiving data package head, if yes, going to Step F1-2; otherwise, setting the second error flag and going to Step G1;

Step F1-2, obtaining code unit data, storing the obtained code unit data in the first character storage; determining whether the first error flag is set, if yes, setting the second error flag; otherwise going to Step F1-3;

Step F1-3, determining whether the code unit data in the first character storage is a second preset code byte, if yes, going to Step F1-4; otherwise, going to Step F1-5;

Step F1-4, keeping on obtaining code unit data, storing the obtained code unit data in the second character storage, determining whether the first error flag is set, if yes, setting the second error flag, otherwise, going to Step F1-6;

Step F1-5, setting the second character storage as empty, and going to Step F1-6;

Step F1-6, combining and decoding the data in the first character storage and the data in the second character storage, determining whether the decoded data is the preset data package head, if yes, going to Step F1-7; otherwise setting the second error flag; and Step F1-7, taking the decoded date as data package head, and storing the data package head at the position corresponding to a current offset in the optical data buffer and updating the current offset.

The method, wherein Step F2 comprises:

Step F2-1, keeping on obtaining code unit data, storing the obtained code unit data in the first character storage, determining whether the first error flag is set, if yes, setting the second error flag and going to Step G1; otherwise, going to Step F2-2;

Step F2-2, determining whether the total package number is 0, if yes, going to Step F2-4; otherwise, going to Step F2-3;

Step F2-3, determining whether the total package number is the value of the first preset position in the first character storage, if yes, going to Step F2-5; otherwise, setting the second error flag and going to Step G1;

Step F2-4, setting the total package number as the value of the first preset position in the first character storage and going to Step F2-5;

Step F2-5, obtaining the current bit of the current package number according to the value of the second preset position in the first character storage, determining whether the current bit of the current package number is set, if yes, setting the second error flag and going to Step G1; otherwise going to Step F2-6;

Step F2-6, setting the current bit of the current package number, updating the current bit of the current package number, and going to Step F2-7; and Step F2-7, storing the data at the second preset position of the first character storage at the position corresponding to the current offset in the optical data buffer and updating the current offset.

The method, wherein Step F3 comprises:

Step F3-1, keeping on obtaining code unit data, storing the obtained code unit data in the first character storage, determining whether the first error flag is set, if yes, setting the second error flag and going to Step G1; otherwise going to Step F3-2;

Step F3-2, storing the code unit data of the first character storage at the position corresponding to the current offset in the optical data buffer and updating the current offset;

Step F3-3, setting the value of the code unit data in the first character storage as data length;

Step F3-4, determining whether the length of the obtained code unit data is less than the data length, if yes, going to Step F3-5; otherwise, going to Step F4;

Step F3-5, keeping on obtaining code unit data and storing the code unit data in the first character storage, determining whether the first error flag is set, if yes, setting the second error flag and going to Step G1; otherwise, going to Step F3-6; and Step F3-6, storing the data of the first character storage in the optical data buffer and the position corresponding to the current offset and updating the current offset, then going back to Step F3-4.

Embodiment 3

Figure 9:
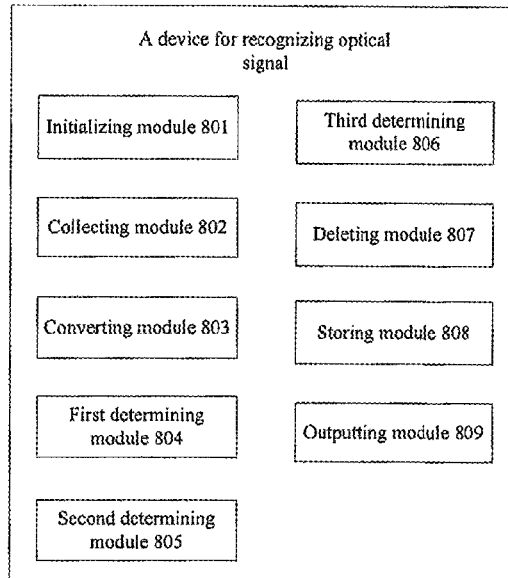
FIG. 9 is a block diagram of a device of recognizing optical signal provided by Embodiment 3.

Embodiment 3 of the present invention provides an optical signal recognizing device, as shown in FIG. 9, which comprises: an initializing module 801, a collecting module 802, a converting module 803, a first determining module 804, a second determining module 805, a third determining module 806, a deleting module 807, a storing module 808 and an outputting module 809; in which the initializing module 801 is configured to perform initializing;

the collecting module 802 is configured to collect optical voltage value in the collecting channel to obtain a set of optical voltage values;

the converting module 803 is configured to compare the set of optical voltage values and the comparison threshold and generate an optical data according to the comparing result;

the first determining module 804 is configured to determine whether the optical data and the last converted optical data are identical;

the second determining module 805 is configured to determine whether number of the optical data in the converting array has reached a preset number;

the third determining module 806 is configured to determine whether the optical data in the converting array are identical;

the deleting module 807 is configured to delete the optical data which is the earliest stored in the converting array;

the storing module 808 is configured to store the collected optical voltage values and store the optical data;

the outputting module 809 is configured to set the frame data as the optical data in the converting array and return the frame data.

In this case, the collecting module 802 comprises a first setting unit, a first collecting unit and a first determining unit;

the first setting unit is configured to set a collecting channel which is not collected in the collecting channels as current collecting channel and update the current collecting channel;

the first collecting unit is configured to collect the voltage value in the current collecting channel and set the collected voltage value as optical voltage value and storing the optical voltage value at the position corresponding to the current collecting channel in a collecting array;

The first determining unit is configured to determine whether voltage values of all collecting channels are collected;

Besides, the collecting module 802 comprises a second setting unit, a second collecting unit and a second determining unit;

the second setting unit is configured to set the collecting channel which has not been collected in the collected channels as the current collecting channel and update the current collecting channel;

the second collecting unit is configured to collect the voltage value of the current collecting channel and performing operation on the collected voltage value and a first preset basement value, taking operation result as optical voltage value and storing the optical voltage value on the position corresponding to the current collecting channel in the collecting array;

the second determining unit is configured to determine whether the voltage values of all collecting channels have been collected.

Besides, the collecting module 802 comprises a third setting unit, a third collecting unit, a first computing unit and a third determining unit;

the third setting unit is configured to set the collecting channel which has not been collected in the collecting channel as the current collecting channel and update the current collecting channel;

the third collecting unit is configured to collect the voltage value of the current collecting channel according to a preset collecting times and store the preset collecting number of the collected voltage values in the collecting array orderly; the third determining unit is configured to determine whether voltage values of all collecting channels are collected.

Besides, the collecting module 802 comprises a fourth setting unit, a fourth collecting unit and a second computing unit and a fourth determining unit;

the fourth setting unit is configured to set the collecting channel, which has not been collected, of the collecting channels as the current collecting channel and update the current collecting channel;

the fourth collecting unit is configured to collect the voltage value of the current collecting channel according to the preset collecting times and store the preset collecting times of collected voltage values in the collecting array;

the second computing unit is configured to perform computing on the preset collecting times of voltage values and a second preset basement value, take computing result as the optical voltage value and store the optical voltage value in the voltage value array and the position corresponding to the current collecting channel;

the fourth determining unit is configured to determine whether voltage values of all collecting channels have been collected.

In this case, the converting module comprises a first comparing unit and a fifth setting unit;

the first comparing unit is configured to comparing the set of the optical voltage values with the preset comparison threshold orderly;

the fifth setting unit is configured to set the bit corresponding to the current optical source voltage value in the converting storage when the optical source voltage value is more than or equal to the preset comparison threshold; reset the bit corresponding to the current optical source voltage value in the converting storage when the optical source voltage value is less than the preset comparison threshold and take the setting result in the converting storage as optical data.

Beside, the converting module 803 comprises a third computing unit, a fifth determining unit, a second comparison unit and a sixth setting unit;

the third computing unit is configured to compute the set of optical voltage value to obtain the comparison threshold;

the fifth determining unit is configured to determine whether the comparison threshold is in a preset category;

the second comparison unit is configured to compare each optical source voltage value in the voltage value array and the comparison threshold respectively;

the sixth setting unit is configured to set the bit corresponding to the optical source voltage value which is more than the comparison threshold in the converting storage and reset the reset bits, reset the rest bits and take the setting result in the converting storage as optical data.

Besides, the converting module comprises a fourth computing unit, a sixth determining unit, a fifth computing unit, a third comparing unit and a seventh setting unit;

the fourth computing unit is configured to calculate absolute value of a difference of every two adjacent data in the voltage value array orderly to obtain a difference of the adjacent data in the voltage value array, take the position of the smaller data in the two adjacent data which have a maximum different as current position;

the sixth determining unit is configured to determine whether the maximum difference is less than a preset different value;

the fifth computing unit is configured to set the comparison threshold as the sum of the half of the maximum difference and the data at the current position in the voltage value array;

the third comparing unit is configured to compare the optical source voltage value and the comparison threshold;

the seventh setting unit is configured to set the bit corresponding to the optical source voltage value which is more than the comparison threshold in the converting storage and the voltage value array, reset the rest bits and set the result in the converting storage as the optical data.

In this case, the initial module 801 comprises a first timer unit configured to initiate a first timer and start counting time;

The device further comprises a fourth determining module configured to determine whether the time of the first timer reaches a first preset time.

The device further comprises a second timer module and a fifth determining module;

the second timer module is configured to initialize a second timer and perform counting time;

the fifth determining module is configured to determine whether the time of the second timer reaches a second preset time.

the device further comprises a sixth determining module, a first obtaining module, a decoding module and a seventh determining module;

the sixth determining module is configured to determine whether the frame data is the first preset code byte;

the first obtaining module is configured to obtain frame data;

the decoding module is configured to decode the frame data in the optical data storage according to decoding way;

the seventh determining module is configured to determine whether decoding is successful;

the outputting module is configured to return the data in the decoding storage.

the device further comprises a setting/resetting module, an eighth determining module, a ninth determining module, a second obtaining module and a code unit data module;

the setting/resetting module is configured to set or reset a first error flag;

the eighth determining module is configured to determine whether data in the decoding storage is decoding error information;

the ninth determining module is configured to determine whether the length of the optical data, which is not stored in the code unit storage, in the decode storage is less than the length of the code unit;

the second obtaining module is configured to obtain optical data;

the code unit data module is configured to take the optical source data, of which the length is code unit length, obtained from the optical source data, which is not stored in the code unit storage, in the code storage as code unit data.

the device further comprises an eleventh determining module, a first setting module, a second setting module and a twelfth determining module;

the eleventh determining module is configured to determine whether the second error flag is set;

the first preset module is configured to clear the content of the first character storage, the second character storage and optical data buffer and set the state of receiving data as state of receiving data head;

the second setting module is configured to set the state of receiving data as state of receiving data head;

the twelfth determining module is configured to determine whether all data package have been received.

the device further comprises a data package head module, a package number module, a package data module, a tenth determining module and error flag module; in which the data package head module is configured to obtain code unit data and take the code unit data as data package head and determine whether data package head is obtained successfully;

the package number module is configured to keep on obtaining code unit data, take the code unit data as total package number and a current package number, store the total package number and the current package number in the optical data buffer;

the package data module is configured to keep on obtaining code unit data, take the code unit data as package data length, keep on obtaining code unit number upon the package data length and take the code unit number as package data content, store the obtained package data content in the optical data buffer;

the tenth determining module is configured to check the data package in the optical data buffer and determine whether the checking is successful;

the error flag module is configured to set the second error flag.

The data package head module comprises a seventh determining unit, a first obtaining unit, a first storing unit, an eighth determining unit, a ninth determining unit, an eighth setting unit, a decode unit, a tenth determining unit and a second storing unit; in which the seventh determining unit is configured to determine whether the state of receiving data is the state of receiving data package head;

the first obtaining unit is configured to obtain code unit data;

the first storing unit is configured to store the obtained code unit data in the first character storage;

the eighth determining unit is configured to determine whether the first error flag is set;

the ninth determining unit is configured to determine whether the code unit data in the first character storage is the second preset code byte;

the eighth setting unit is configured to set the second character storage as empty or store the obtained code unit data in the second character storage;

the decode unit is configured to combine and decode the data in the first character storage and the data in the second character storage;

the tenth determining unit is configured to determine whether the decoded data is the preset data package head;

the first storing unit is configured to take the decoded data as the data package head in the position corresponding to the current offset in the optical data buffer and update the current offset.

The package number module comprises an eleventh determining unit, a twelfth determining unit, a thirteenth determining unit, a ninth setting unit, a fourteenth determining unit, a setting unit and a third storing unit; in which the eleventh determining unit is configured to determine whether the first error flag is set;

the twelfth determining unit is configured to determine whether the total package number is 0;

the thirteenth determining unit is configured to determine whether the total package number is the value of the first preset position in the first character storage;

the ninth setting unit is configured to set the total package number as the value of the first preset position of the data in the first character storage;

the fourteenth determining unit is configured to obtain current bit of the current package number upon the value of the second preset position in the first character storage;

the setting unit is configured to set the current bit of the current package number and update the current bit of the package number; and the third storing unit is configured to store the data at the position of the second preset position of the first character storage in the position corresponding to the current offset, update the current offset.

In this case, the package data module comprises a fifteenth determining unit, a fourth storing unit, a tenth setting unit, a sixteenth determining unit and a seventeenth determining unit;

the fifteenth determining unit is configured to determine whether the first error flag is set;

the fourth storing unit is configured to store the code unit data in the first character storage in the position corresponding to the current offset in the optical data buffer and update the current offset;

the tenth setting unit is configured to set the data length as the value of the code unit data in the first character storage;

the sixteenth determining unit is configured to determine whether the length of the obtained code unit data is less than the data length;

the seventh determining unit is configured to check the data in the optical data buffer and determine whether the checking is successful.

The described embodiments are merely particular embodiments of the disclosure and the embodiments are not intended to limit the present invention. Any alteration or change obvious to those skilled in the art based on the disclosure should fall in the scope of protection of the present invention. Therefore, the disclosure intends to protect what is claimed in claims.

The invention claimed is:

1. A method for recognizing optical signal comprising the steps of:

Step S0, initializing a device of recognizing optical signal;

Step S1, collecting an optical source voltage value in a collecting channel, obtaining a set of optical source voltage values, and storing the collected set of optical source voltage values into a voltage value array;

Step S2, comparing the set of optical source voltage values with a comparison threshold, and generating optical data according to comparing result;

Step S3, determining whether the optical data is identical to the optical data obtained by last time of converting, if yes, going back to Step S1; otherwise, going to Step S4;

Step S4, collecting optical source voltage values in the collecting channel, obtaining a set of optical source values, comparing the set of optical source values with the comparison threshold, generating optical data according to comparison result, and storing the optical data into a converting array;

Step S5, determining whether the number of the optical data in the converting array reaches a preset number, if yes, executing Step S6; otherwise, executing Step S4;

Step S6, determining whether respective optical data in the converting array are identical, if yes, executing Step S8; otherwise, executing Step S7;

Step S7, deleting the optical data which is the earliest stored in the converting array, and going back to Step S4; and Step S8, setting frame data as the optical data in the converting array, and returning the frame data.

2. The method of claim 1, wherein collecting optical source voltage values in the collecting channel specifically comprises:

Step A1-1, setting a collecting channel which is not yet collected in the collecting channels as a current collecting channel;

Step A1-2, collecting the voltage value in the current collecting channel, taking a collected voltage value as the optical source voltage value, and storing the optical source voltage value at the position corresponding to the current collecting channel in the collecting array;

Step A1-3, determining whether the voltage values of all the collecting channels have been collected, if yes, collecting is ended; otherwise, updating the current collecting channel and going back to Step A1-2; or Step A2-1, setting the collecting channel which is not yet collected in the collecting channels as a current collecting channel;

Step A2-2, collecting the voltage values of the current collecting channel, performing operation on the collected voltage value and a first preset baseline value, taking operation result as optical source voltage value, and storing the optical source voltage value at the position corresponding to the current collecting channel in the collecting array;

Step A2-3, determining whether the voltage values of all the collecting channels have been collected, ending collection if the voltage values of all the collecting channels have been collected; otherwise, updating the current collecting channel and going back to Step A2-2; or Step A3-1, setting the collecting channel which is not yet collected in the collecting channels as a current collecting channel;

Step A3-2, collecting the voltage value of the current collecting channel according to a preset collecting times, and storing a preset collecting times of collected voltage values in a collecting array orderly;

Step A3-3, performing operation on the preset collecting times of voltage values in the collecting array, setting the operation result as optical source voltage value, and storing the optical source voltage value at the position corresponding to the current collecting channel in the voltage value array;

Step A3-4, determining whether voltage values of all collecting channels have been collected; if yes, collecting is ended; otherwise, updating the current collecting channel and going back to Step A3-2; or Step A4-1, setting a collecting channel which has not yet been collected in the collecting channels as a current collecting channel;

Step A4-2, collecting the voltage value of the current collecting channel according to the preset collecting times, and storing the preset collecting times of the collected voltage values in the collecting array;

Step A4-3, performing operation on the preset collecting times of voltage values in the collecting array and a second preset baseline value; taking operation result as optical source voltage value, and storing the operation result in the position corresponding to the current collecting channel in the voltage value array;

Step A4-4, determining whether the voltage values of all collecting channels have been collected, if yes, collecting is ended; otherwise, updating the current collecting channel and going back to Step A4-2.

3. The method of claim 1, wherein comparing the set of optical values with the comparison threshold and generating an optical data according to the comparison result specifically comprises:

Step B1-1, comparing each optical source voltage value in the set of optical source voltage values with the preset comparison threshold orderly, if the current optical source voltage value is greater than or equal to the preset comparison threshold, setting a bit corresponding to the current optical voltage value in converting storage; if the current optical source voltage value is less than the preset comparison threshold, resetting the bit corresponding to the bit corresponding to the current optical source voltage value in the converting storage, and taking the setting result in the converting storage as optical data; or Step B2-1, performing operation on the set of optical source voltage values, and taking operation result as comparison threshold;

Step B2-2, determining whether the comparison threshold is in a preset category, if yes, executing Step B2-3; otherwise, storing error information in the converting storage, and going back to the error information in the converting storage;

Step B2-3, comparing each optical source voltage value in the voltage value array with the comparison threshold, setting the bit corresponding to the current optical source voltage value, which is greater than the comparison threshold, in the converting storage, and resetting the reset bits; setting the setting result in the converting storage as optical data; or Step B3-1, calculating absolute value of difference of every two adjacent data in the voltage value array orderly to obtain difference of every two adjacent data in the voltage value array, taking the position of the smaller data in the two adjacent data which have a maximum difference as current position;

Step B3-2, determining whether the maximum difference is less than a preset difference, storing converting error information in the converting storage, returning the error information in the converting storage; otherwise executing Step B3-3;

Step B3-3, setting the comparison threshold as sum of half of the maximum difference and the data at the current position in the voltage value array; and Step B3-4, comparing each optical source voltage value in the voltage value array and the comparison threshold respectively, setting the bit corresponding to the optical source voltage value, which is greater than the comparison threshold, in the voltage value array and the converting storage, resetting the rest bits, and taking the setting result in the converting storage as optical data.

4. The method of claim 1, wherein Step S0 comprises: the initializing a first timer,
when the determining in Step S3 is yes, determining whether the time of the first timer reaches a preset time, if yes, returning error information; otherwise going back to Step S1.

5. The method of claim 4, wherein Step S4 further comprises: the initializing a second timer;
when the determining in Step S6 is no, determining whether the time of the timer reaches a second preset time, if yes, returning error information; otherwise executing Step S7.

6. The method of claim 1, wherein after that the determining in Step S8 is no, the method further comprises:
Step D1, determining whether the frame data is a first preset coding byte, if yes, executing Step D2; otherwise, storing the frame data as optical source data in a decoding storage, going to Step D5;
Step D2, keeping on obtaining frame data, storing the obtained frame data in the optical data storage;
Step D3, decoding the frame data in the optical data storage in a decoding way and determining whether the decoding is successful, if yes, executing Step D4; otherwise, storing error information in the decoding storage and executing Step D5;
Step D4, storing the decoded frame data as optical source data in the decoding storage, and executing Step D5; and
Step D5, returning the data in the decoding storage.

7. The method of claim 6, wherein after Step D5, the method further comprises:
Step E0, resetting a first error flag;
Step E1, determining whether the data in the decoding storage is decoding error information, resetting the first error flag, storing the error information in the decode unit storage; otherwise, going to Step E2;
Step E2, determining whether the length of the optical source data, which is not stored in the code unit storage, in the code storage is less than the length of the code unit, if yes, going back to Step E3; otherwise going to Step E4;
Step E3, keeping on obtaining optical source data, storing the optical source data in the decoding storage, and going back to Step E1; and
Step E4, taking the optical source data, of which the length is code unit length, obtained from the start position of the optical source data, which is not stored in the code unit storage, in the decoding storage as code unit data, and storing the code unit data in the code unit storage.

8. The method of claim 7, wherein when the determining in Step E1 is yes and after Step E4, the method further comprises:
Step G0, obtaining single package data;
Step G1, determining whether a second error flag is set, if yes, executing Step G2; otherwise executing Step G3;
Step G2, clearing content of a first character storage, a second character storage, and an optical data buffer, setting data receiving state as state of receiving data package head, and going back to Step G0;
Step G3, setting the data receiving state as the state of receiving data package head, and going to Step G4;
Step G4, determining whether all of data package has been received, if yes, ending the process; otherwise going back to Step G0.

9. The method of claim 8, wherein obtaining single package data specifically comprises:
Step F1, obtaining data in the code unit storage, taking the data in the code unit storage as data package head, determining whether data package head is obtained successfully, if yes, storing the data package head in the optical data buffer and going to Step F2; otherwise, setting the second error flag and going to Step G1;
Step F2, keeping on obtaining code unit data, taking the code unit data as total package number and current package number, and storing the total package number and the current package number in the optical data buffer;
Step F3, keeping on obtaining code unit data, taking the code unit data as package data length, keeping on obtaining code unit number as package data content according to the package data length, and storing the obtained package data content in the optical data buffer;
Step F4, checking the data package in the optical data buffer, and determining whether checking is successful, if yes, returning receiving correction information and going to Step G1; otherwise, setting the second error flag and going to Step G1.

10. The method of claim 9, wherein Step F1 comprises:

Step F1-1, determining whether the data receiving state is state of receiving data package head, if yes, going to Step F1-2; otherwise, setting the second error flag and going to Step G1;

Step F1-2, obtaining code unit data, storing the obtained code unit data in the first character storage; determining whether the first error flag is set, if yes, setting the second error flag; otherwise going to Step F1-3;

Step F1-3, determining whether the code unit data in the first character storage is a second preset code byte, if yes, going to Step F1-4; otherwise, going to Step F1-5;

Step F1-4, keeping on obtaining code unit data, storing the obtained code unit data in the second character storage, determining whether the first error flag is set, if yes, setting the second error flag, otherwise, going to Step F1-6;

Step F1-5, setting the second character storage as empty, and going to Step F1-6;

Step F1-6, combining and decoding the data in the first character storage and the data in the second character storage, determining whether the decoded data is the preset data package head, if yes, going to Step F1-7; otherwise setting the second error flag; and Step F1-7, taking the decoded date as data package head, and storing the data package head at the position corresponding to a current offset in the optical data buffer and updating the current offset.

11. The method of claim 9, wherein Step F2 comprises:

Step F2-1, keeping on obtaining code unit data, storing the obtained code unit data in the first character storage, determining whether the first error flag is set, if yes, setting the second error flag and going to Step G1; otherwise, going to Step F2-2;

Step F2-2, determining whether the total package number is 0, if yes, going to Step F2-4; otherwise, going to Step F2-3;

Step F2-3, determining whether the total package number is the value of the first preset position in the first character storage, if yes, going to Step F2-5; otherwise, setting the second error flag and going to Step G1;

Step F2-4, setting the total package number as the value of the first preset position in the first character storage and going to Step F2-5;

Step F2-5, obtaining the current bit of the current package number according to the value of the second preset position in the first character storage, determining whether the current bit of the current package number is set, if yes, setting the second error flag and going to Step G1; otherwise going to Step F2-6;

Step F2-6, setting the current bit of the current package number, updating the current bit of the current package number, and going to Step F2-7; and Step F2-7, storing the data at the second preset position of the first character storage at the position corresponding to the current offset in the optical data buffer and updating the current offset.

12. The method of claim 9, wherein Step F3 comprises:

Step F3-1, keeping on obtaining code unit data, storing the obtained code unit data in the first character storage, determining whether the first error flag is set, if yes, setting the second error flag and going to Step G1; otherwise going to Step F3-2;

Step F3-2, storing the code unit data of the first character storage at the position corresponding to the current offset in the optical data buffer and updating the current offset;

Step F3-3, setting the value of the code unit data in the first character storage as data length;

Step F3-4, determining whether the length of the obtained code unit data is less than the data length, if yes, going to Step F3-5; otherwise, going to Step F4;

Step F3-5, keeping on obtaining code unit data and storing the code unit data in the first character storage, determining whether the first error flag is set, if yes, setting the second error flag and going to Step G1; otherwise, going to Step F3-6; and Step F3-6, storing the data of the first character storage in the optical data buffer and the position corresponding to the current offset and updating the current offset, then going back to Step F3-4.

13. An optical signal recognizing device, comprising: an initializing module, a collecting module, a converting module, a first determining module, a second determining module, a third determining module, a deleting module, a storing module and an outputting module, in which the initializing module is configured to perform initializing;

the collecting module is configured to collect optical voltage value in the collecting channel to obtain a set of optical voltage values;

the converting module is configured to compare the set of optical voltage values and the comparison threshold and generate an optical data according to the comparing result;

the first determining module is configured to determine whether the optical data and the last converted optical data are identical;

the second determining module is configured to determine whether the number of the optical data in the converting array has reached a preset number;

the third determining module is configured to determine whether the optical data in the converting array are identical;

the deleting module is configured to delete the optical data which is the earliest stored in the converting array;

the storing module is configured to store the collected optical voltage values and store the optical data; and the outputting module is configured to set the frame data as the optical data in the converting array and return the frame data; and wherein the collecting module comprises a first setting unit, a first collecting unit and a first determining unit, in which the first setting unit is configured to set a collecting channel which is not yet collected in the collecting channels as current collecting channel and update the current collecting channel;

the first collecting unit is configured to collect the voltage value in the current collecting channel, set the collected voltage value as optical voltage value, and store the optical voltage value at the position corresponding to the current collecting channel in a collecting array;

the first determining unit is configured to determine whether voltage values of all collecting channels are collected; or the collecting module comprises a second setting unit, a second collecting unit and a second determining unit, in which the second setting unit is configured to set the collecting channel which has not been collected in the collected channels as the current collecting channel and update the current collecting channel;

the second collecting unit is configured to collect the voltage value of the current collecting channel, perform operation on the collected voltage value and a first preset basement value, take operation result as optical voltage value, and store the optical voltage value at the position corresponding to the current collecting channel in the collecting array;

the second determining unit is configured to determine whether the voltage values of all collecting channels have been collected; or the collecting module comprises a third setting unit, a third collecting unit, a first computing unit and a third determining unit, in which the third setting unit is configured to set the collecting channel which has not been collected in the collecting channel as the current collecting channel and update the current collecting channel;

the third collecting unit is configured to collect the voltage value of the current collecting channel according to a preset collecting times and store the preset collecting number of the collected voltage values in the collecting array orderly;

the first computing unit is configured to calculate the preset collecting times of voltage values in the collecting array, take the computing result as optical voltage value and store the optical voltage value at the position corresponding to the current collecting channel in the voltage value array;

the third determining unit is configured to determine whether voltage values of all collecting channels are collected: or the collecting module comprises a fourth setting unit, a fourth collecting unit and a second computing unit and a fourth determining unit, in which the fourth setting unit is configured to set the collecting channel, which has not been collected, of the collecting channels as the current collecting channel and update the current collecting channel;

the fourth collecting unit is configured to collect the voltage value of the current collecting channel according to the preset collecting times and store the preset collecting times of collected voltage values in the collecting array;

the second computing unit is configured to perform computing on the preset collecting times of voltage values and a second preset basement value, take computing result as the optical voltage value and store the optical voltage value in the voltage value array at the position corresponding to the current collecting channel; and the fourth determining unit is configured to determine whether voltage values of all collecting channels have been collected.

14. The method of claim 13, wherein the converting module comprises a first comparing unit and a fifth setting unit, in which the first comparing unit is configured to compare the set of the optical voltage values with the preset comparison threshold orderly;

the fifth setting unit is configured to set the bit corresponding to the current optical source voltage value in the converting storage when the optical source voltage value is greater than or equal to the preset comparison threshold; reset the bit corresponding to the current optical source voltage value in the converting storage when the optical source voltage value is less than the preset comparison threshold, and take the setting result in the converting storage as optical data, or the converting module comprises a third computing unit, a fifth determining unit, a second comparison unit and a sixth setting unit, in which the third computing unit is configured to compute the set of optical voltage value to obtain the comparison threshold;

the fifth determining unit is configured to determine whether the comparison threshold is in a preset category;

the second comparison unit is configured to compare each optical source voltage value in the voltage value array and the comparison threshold respectively; and the sixth setting unit is configured to set the bit corresponding to the optical source voltage value which is greater than the comparison threshold in the converting storage, reset the rest bits, and take the setting result in the converting storage as optical data; or the converting module comprises a fourth computing unit, a sixth determining unit, a fifth computing unit, a third comparing unit and a seventh setting unit, in which the fourth computing unit is configured to calculate absolute value of difference of every two adjacent data in the voltage value array orderly to obtain difference of the adjacent data in the voltage value array, take the position of the smaller data in the two adjacent data which have a maximum difference as current position;

the sixth determining unit is configured to determine whether the maximum difference is less than a preset different value;

the fifth computing unit is configured to set the comparison threshold as the sum of the half of the maximum difference and the data at the current position in the voltage value array;

the third comparing unit is configured to compare the optical source voltage value and the comparison threshold; and the seventh setting unit is configured to set the bit corresponding to the optical source voltage value which is greater than the comparison threshold in the converting storage and the voltage value array, reset the rest bits and set the result in the converting storage as the optical data.

15. The method of claim 13, wherein the device further comprises a second timer module and a fifth determining module, in which the second timer module is configured to initialize a second timer and perform counting time;

the fifth determining module is configured to determine whether the time of the second timer reaches a second preset time.

16. The method of claim 13, wherein the device further comprises a sixth determining module, a first obtaining module, a decoding module and a seventh determining module, in which the sixth determining module is configured to determine whether the frame data is the first preset code byte;

the first obtaining module is configured to obtain frame data;

the decoding module is configured to decode the frame data in the optical data storage according to decoding way;

the seventh determining module is configured to determine whether decoding is successful; and the outputting module is configured to return the data in the decoding storage.

17. The method of claim 16, wherein the device further comprises a setting/resetting module, an eighth determining module, a ninth determining module, a second obtaining module and a code unit data module, in which the setting/resetting module is configured to set or reset a first error flag;

the eighth determining module is configured to determine whether data in the decoding storage is decoding error information;

the ninth determining module is configured to determine whether the length of the optical data, which is not stored in the code unit storage, in the decode storage is less than the length of the code unit;

the second obtaining module is configured to obtain optical data; and the code unit data module is configured to take the optical source data, of which the length is code unit length, obtained from the optical source data, which is not stored in the code unit storage, in the code storage as code unit data.

18. The method of claim 17, wherein the device further comprises an eleventh determining module, a first setting module, a second setting module and a twelfth determining module, in which the eleventh determining module is configured to determine whether the second error flag is set;

the first preset module is configured to clear the content of the first character storage, the second character storage and the optical data buffer, and set the state of receiving data as state of receiving data head;

the second setting module is configured to set the state of receiving data as state of receiving data head; and the twelfth determining module is configured to determine whether all data package have been received.

19. The method of claim 18, wherein the device further comprises a data package head module, a package number module, a package data module, a tenth determining module and error flag module, in which the data package head module is configured to obtain code unit data, take the code unit data as data package head, and determine whether data package head is obtained successfully;

the package number module is configured to keep on obtaining code unit data, take the code unit data as total package number and a current package number, and store the total package number and the current package number in the optical data buffer;

the package data module is configured to keep on obtaining code unit data, take the code unit data as package data length, keep on obtaining code unit number upon the package data length and take the code unit number as package data content, and store the obtained package data content in the optical data buffer;

the tenth determining module is configured to check the data package in the optical data buffer and determine whether the checking is successful; and the error flag module is configured to set the second error flag.

20. The method of claim 19, wherein the data package head module comprises a seventh determining unit, a first obtaining unit, a first storing unit, an eighth determining unit, a ninth determining unit, an eighth setting unit, a decode unit, a tenth determining unit and a second storing unit, in which the seventh determining unit is configured to determine whether the state of receiving data is the state of receiving data package head;

the first obtaining unit is configured to obtain code unit data;

the first storing unit is configured to store the obtained code unit data in the first character storage;

the eighth determining unit is configured to determine whether the first error flag is set;

the ninth determining unit is configured to determine whether the cod unit data in the first character storage is the second preset code byte;

the eighth setting unit is configured to set the second character storage as empty or store the obtained code unit data in the second character storage;

the decode unit is configured to combine and decode the data in the first character storage and the data in the second character storage;

the tenth determining unit is configured to determine whether the decoded data is the preset data package head; and the first storing unit is configured to take the decoded data as the data package head at the position corresponding to the current offset in the optical data buffer and update the current offset.

21. The method of claim 19, wherein the package number module comprises an eleventh determining unit, a twelfth determining unit, a thirteenth determining unit, a ninth setting unit, a fourteenth determining unit, a setting unit and a third storing unit, in which the eleventh determining unit is configured to determine whether the first error flag is set;

the twelfth determining unit is configured to determine whether the total package number is 0;

the thirteenth determining unit is configured to determine whether the total package number is the value of the first preset position in the first character storage;

the ninth setting unit is configured to set the total package number as the value of the first preset position of the data in the first character storage;

the fourteenth determining unit is configured to obtain current bit of the current package number upon the value of the second preset position in the first character storage, and determine whether the current bit of the current package number is set;

the setting unit is configured to set the current bit of the current package number and update the current bit of the current package number;

the third storing unit is configured to store the data at the position of the second preset position of the first character storage at the position corresponding to the current offset, update the current offset; or the package data module comprises a fifteenth determining unit, a fourth storing unit, a tenth setting unit, a sixteenth determining unit and a seventeenth determining unit, in which the fifteenth determining unit is configured to determine whether the first error flag is set;

the fourth storing unit is configured to store the code unit data in the first character storage at the position corresponding to the current offset in the optical data buffer and update the current offset;

the tenth setting unit is configured to set the data length as the value of the code unit data in the first character storage;

the sixteenth determining unit is configured to determine whether the length of the obtained code unit data is less than the data length; and the seventh determining unit is configured to check the data in the optical data buffer and determine whether the checking is successful.

* * * * *